(12) United States Patent
Ye

(10) Patent No.: US 12,531,479 B2
(45) Date of Patent: Jan. 20, 2026

(54) ELECTRONIC DEVICES, ELECTRONIC SYSTEMS, AND POWER SUPPLY CIRCUITS

(71) Applicant: YANGTZE MEMORY TECHNOLOGIES CO., LTD., Wuhan (CN)

(72) Inventor: Gaoyang Ye, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/677,327

(22) Filed: May 29, 2024

(65) Prior Publication Data
US 2025/0274041 A1 Aug. 28, 2025

(30) Foreign Application Priority Data
Feb. 28, 2024 (CN) .......................... 202410224573.6

(51) Int. Cl.
*H02M 3/04* (2006.01)

(52) U.S. Cl.
CPC ..................................... *H02M 3/04* (2013.01)

(58) Field of Classification Search
None
See application file for complete search history.

(56) References Cited

U.S. PATENT DOCUMENTS

| | | | | |
|---|---|---|---|---|
| 11,218,026 | B1 * | 1/2022 | Hansen | ............ H02M 3/01 |
| 11,532,457 | B2 * | 12/2022 | Bowman | ............ H01F 19/08 |

* cited by examiner

*Primary Examiner* — Jeffrey S Zweizig
(74) *Attorney, Agent, or Firm* — Conley Rose, P.C

(57) ABSTRACT

Implementations of the present disclosure disclose electronic devices, electronic systems and power supply circuits. An example electronic device includes: a power supply structure including a node, through which a voltage is supplied; and a first circuit having its one end coupled to the node via a first resistor and the other end grounded; and a package structure including a second circuit and a die circuit that are connected in parallel between the node and a grounding node, wherein the second circuit, the first circuit and the first resistor are equivalent to a parallel resistor-inductor-capacitor circuit.

20 Claims, 14 Drawing Sheets

ELECTRONIC DEVICES, ELECTRONIC SYSTEMS, AND POWER SUPPLY CIRCUITS

CROSS-REFERENCE TO RELATED APPLICATIONS

The present application claims Chinese Patent Application No. 2024102245736, which was filed Feb. 28, 2024, is titled "ELECTRONIC DEVICES, ELECTRONIC SYSTEMS AND POWER SUPPLY CIRCUITS," and is hereby incorporated herein by reference in its entirety.

TECHNICAL FIELD

The present disclosure relates to the field of semiconductor technology, and in examples to electronic devices, electronic systems and power supply circuits.

BACKGROUND

During semiconductor fabrication, fabrication about a wafer is done, then the wafer is cut into one or more dies, and the dies are packaged using a packaging substrate and other packaging materials to obtain the package structure so as to avoid direct contact between the dies and the external environment and reduce damages to the dies. The package structure is applied in various integrated circuits to give play to electrical performance of the dies.

The package structure is coupled to a printed circuit board (PCB) through plugging, adhesion, soldering or the like to integrate the package structure onto the printed circuit board, on which some circuits or devices can supply power to the package structure.

SUMMARY

According to some aspects of implementations of the present disclosure, an electronic device is provided, the electronic device including: a power supply structure including a node, through which a voltage is supplied; and a first circuit having its one end coupled to the node via a first resistor and the other end grounded; and a package structure including a second circuit and a die circuit that are connected in parallel between the node and a grounding node, wherein the second circuit, the first circuit and the first resistor are equivalent to a parallel resistor-inductor-capacitor circuit.

In some implementations, the first circuit includes a first capacitor and a first inductor connected in series.

In some implementations, the electronic device includes a plurality of first circuits connected in parallel, wherein the first resistor is connected in series with one of the plurality of first circuits nearest to the second circuit.

In some implementations, the second circuit includes: a second resistor, a second inductor and a second capacitor connected in series, wherein one end of the second circuit is coupled to the node and the other end of the second circuit is grounded.

In some implementations, the power supply structure further includes: a third circuit, wherein one end of the third circuit is coupled to the node and the other end of the third circuit is grounded, and the third circuit is connected with the first circuit in parallel and includes a third resistor, a third inductor and a third capacitor connected in series.

In some implementations, the power supply structure further includes a voltage generating circuit having its output terminal coupled to the node.

In some implementations, the electronic device further includes a fourth inductor, through which one end of the second circuit is coupled to the node.

In some implementations, the package structure further includes a fifth inductor, through which the die circuit is coupled to the node.

In some implementations, the first resistor has a resistance value in the range of 0.5 Ohm~5 Ohm, and the operating frequency of the die circuit is in the range of 0~300 MHz.

In some implementations, the electronic device further includes: a first substrate, on which the power supply structure is located, wherein the package structure further includes a second substrate, the second circuit is located on and/or in the second substrate, and the die circuit is located on the second substrate, and the surface of the first substrate on the side having the first circuit disposed thereon is fixed to the surface of the second substrate on the side away from the die circuit.

In some implementations, the package structure includes: a semiconductor device including the die circuit, wherein the semiconductor device is located on the second substrate.

According to some aspects of implementations of the present disclosure, an electronic system is provided, the electronic system including the described electronic device, wherein the package structure includes at least one of a memory device or a memory controller that is coupled to the memory device and is configured to control the memory device.

According to some aspects of implementations of the present disclosure, a power supply circuit is provided, the power supply circuit including: a node, through which a package structure is supplied with power; and a first circuit having its one end coupled to the node via a first resistor and the other end grounded, wherein the package structure includes a second circuit and a die circuit that are connected in parallel between the node and a grounding node, and the second circuit, the first circuit and the first resistor are equivalent to a parallel resistor-inductor-capacitor circuit.

In some implementations, the first circuit includes a first capacitor and a first inductor connected in series.

In some implementations, the power supply circuit includes a plurality of first circuits connected in parallel, wherein the first resistor is connected in series with one of the plurality of first circuits nearest to the second circuit.

In some implementations, the second circuit includes: a second resistor, a second inductor and a second capacitor connected in series, wherein one end of the second circuit is coupled to the node and the other end of the second circuit is grounded.

In some implementations, the power supply circuit further includes: a third circuit, wherein one end of the third circuit is coupled to the node and the other end of the third circuit is grounded, and the third circuit is connected with the first circuit in parallel and includes a third resistor, a third inductor and a third capacitor connected in series.

In some implementations, the power supply circuit further includes a voltage generating circuit having its output terminal coupled to the node.

In some implementations, the power supply circuit further includes a fourth inductor, through which one end of the second circuit is coupled to the node.

In some implementations, the package structure further includes a fifth inductor, through which the die circuit is coupled to the node.

In some implementations, the first resistor has a resistance value in the range of 0.5 Ohm~5 Ohm, and the operating frequency of the die circuit is in the range of 0~300 MHz.

The implementations of the present disclosure provide an electronic device including: a power supply structure, a first circuit and a package structure, wherein the package structure includes a second circuit and a die circuit, one end of the first circuit is coupled to a node of the power supply structure via a first resistor, and the second circuit and the die circuit are connected in parallel between the node and a grounding node, and the node provides voltages for supplying power to the package structure, so that the die circuit in the package structure may give play to functions of control, storage, communication and the like. The second circuit, the first circuit and the first resistor may be equivalent to a parallel resistor-inductor-capacitor circuit (a parallel RLC circuit), the first resistor is configured to reduce the quality factor of the equivalent parallel RLC circuit, reduce oscillation of the power supply circuit and in turn the interference to the die circuit, reduce the resistance at the terminal of the die circuit and improve the reliability of power supply for the die circuit.

Figure 1:
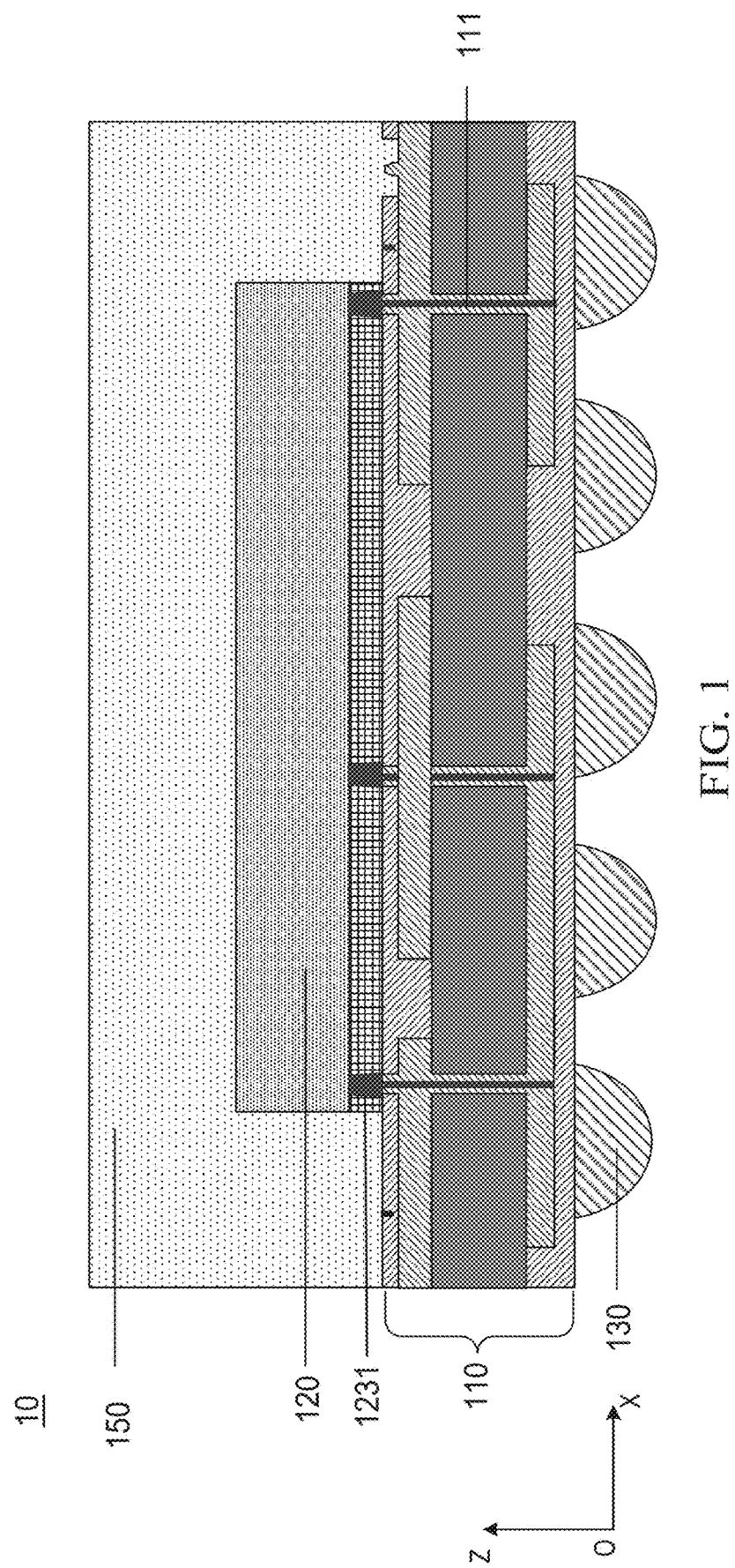
FIG. 1 is a first schematic diagram of a package structure illustrated according to an example implementation.

In the above-described accompanying drawings (not necessarily drawn to scale), similar reference numerals may designate similar components in different figures. Similar reference numerals with different character suffixes may designate different instances of similar components. For the purpose of illustration rather than limitation, the accompanying drawings illustrate individual implementations to be discussed herein.

DETAILED DESCRIPTION

Hereinafter, example implementations disclosed by the present disclosure will be described in more detail with reference to accompanying drawings. Although example implementations of the present disclosure are illustrated in accompanying drawings, it should be understood that the present disclosure can be embodied in various forms and is not limited to the detailed description described herein. On the contrary, these implementations are provided for more thorough understanding of the present disclosure and to convey the scope disclosed by the present disclosure fully to those skilled in the art.

In the description hereafter, many details are provided to facilitate more thorough understanding of the present disclosure. However, it is apparent for those skilled in the art that the present disclosure can be implemented without one or more of these details. In other examples, in order not to obscure the present disclosure, some technical features well known in the art will not be described. That is to say, not all features of practical implementations will be described herein and well-known functions and structures will not be described in detail.

It should be appreciated that when an element or a layer is said to be "over", "adjacent to", "connected to" or "coupled to" another element or layer, it may be directly over, adjacent to, connected to or coupled to the another element or layer or an intervening element or layer may exist therebetween. On the contrary, when an element is said to be "directly on", "directly adjacent to", "directly connected to" or "directly coupled to" another element or layer, there is no intervening element or layer therebetween. It should be appreciated that although various elements, components, regions, layers and/or parts may be described using terms "first", "second", "third" or the like, they should be not limited by those terms. The terms are only used to distinguish one element, component, region, layer or part from another element, component, region, layer or part. Therefore, a first element, component, region, layer or part discussed hereafter may be instead expressed as a second element, component, region, layer or part without departing from the teaching of the present disclosure. When a second element, component, region, layer or part is in discussion, it is not intended to indicate that a first element, component, region, layer or part must exist.

Spatially relative terms, such as "below", "beneath", "lower", "under", "over" and "above", are used herein for ease of description to explain the relationship of one element or feature with other elements or features as shown in the figures. It should be appreciated that, in addition to the orientations shown in the figures, different orientations of devices in use and operation are also intended to be covered by those spatially relative terms. For example, if a device in the drawing is turned upside down, the element or feature described to be "beneath", "under" or "below" another element or feature will have the orientation of being "over" the another element or feature. Therefore, example terms "beneath" and "under" may include orientations of both "below" and "above". The device may be otherwise oriented (rotated 90 degrees or at other orientations) and the spatially relative descriptors used herein may likewise be interpreted accordingly.

Terminology is used herein only for description of implementations and in no way for limiting the present disclosure. As used herein, the terms "a", "an" and "the" in singular forms are also intended to cover plural forms, unless the context clearly indicates otherwise. It should be also appreciated that terms "comprise", "comprising", "include" and/or "including", as used in the specification, specify presence of the described features, integers, steps, operations, elements and/or components, but do not exclude presence or addition of one or more other features, integers, steps, operations, elements, components and/or combinations thereof. As used herein, the term "and/or" includes any and all combinations of relevant listed items.

It should be understood that "some implementations" or "an implementation" mentioned throughout the specification means that particular features, structures or characteristics in association with the implementation may be included in at least one implementation of the present disclosure. Therefore, "in some implementations" or "in an implementation" mentioned throughout the specification refers not necessarily to the same implementations. Moreover, these particular features, structures or characteristics may be incorporated in one or more implementations in any suitable manner. It should be understood that, in various implementations of the present disclosure, the ordinal numbers of the various processes above are not intended to indicate that the processes must be performed in any sequential order, and the various processes should be performed in a sequential order determined depending on their functions and inherent logic, and should not constitute any limitation on implementation processes of implementations of the present disclosure.

A semiconductor packaging process may include: providing a semiconductor device having an electrical function; placing the semiconductor device on a packaging substrate; and enclosing the semiconductor device with packaging materials. The semiconductor devices may be coupled through the packaging substrate. Conductive contacts and conductive balls are disposed on the surface of the packaging substrate on the side without the semiconductor device. The conductive balls may lead out an electrical signal from the packaging substrate to achieve interconnection of electrical signal between the semiconductor device and an external integrated circuit. The conductive balls or contacts may be or not be a portion of a package structure and may be fixed and coupled to conductive contacts on a printed circuit board through soldering or may be fixed to the printed circuit board by plugging snap fasteners with the conductive balls being in contact with and coupled to conductive contacts on the printed circuit board in a non-soldering way.

One semiconductor device may include one or more semiconductor dies and one package structure may package one or more semiconductor devices. That is to say, one package structure may package one or more semiconductor dies, and one semiconductor die may be one cut from a wafer after fabrication along a predetermined dicing street or dicing line. Then the package structure is integrated onto the printed circuit board through soldering, adhesion or plugging to achieve electrical functions of the semiconductor device or semiconductor die.

A plurality of package structures, wirings or other electronic elements may be integrated onto the printed circuit board. For example, the printed circuit board may have a power supply structure disposed thereon, which may be input with external DC or AC power and output voltages required by the package structures to the package structures after voltage conversion. The printed circuit board may be a first substrate and the packaging substrate of the package structure may be a second substrate.

In some implementations, with reference to FIG. 1, an example structure of a package structure 10 is provided, the example structure including: a second substrate 110 (a packaging substrate) having a first surface and a second surface disposed opposite to each other in a z direction, wherein the z direction may be the thickness direction of the second substrate 110, the first surface may be the upper surface in the positive z direction and the second surface may be the lower surface in the negative z direction; and a semiconductor device 120 located on the first surface, wherein the area of the first surface of the second substrate 110 may be larger than the area of the semiconductor device 120. The second substrate 110 may provide the semiconductor device 120 with mechanical support, and also an electrically leading out structure to lead out electrical signals from the semiconductor device 120, enabling interconnection of electrical signals with the structure such as an external printed circuit board or with other integrated circuit devices. The second substrate 110 may include a semiconductor material such as a silicon interposer, a germanium interposer or the like, and may further include organic resin, glass, ceramic or the like.

In some implementations, with reference to FIG. 1, the semiconductor device 120 has a first face and a second face disposed opposite to each other in the z direction, the first face may be the upper surface of the semiconductor device 120 in the positive z direction and the second face may be the lower surface of the semiconductor device 120 in the negative z direction. A plurality of first conductive contacts 1231 may be disposed on the second face of the semiconductor device 120 and configured for coupling to an interconnection layer (or a conductive layer, a conductive line or a conductive structure) on the second substrate 110. The interconnection layer may be a power distribution network (PDN) or a portion thereof and may include, but not limited to, conductive lines, conductive pathways (conductive plugs), conductive contacts, pads or other conductive structure. The power distribution network may further include capacitors, inductors, resistors, grounding nodes or other device structures on the second substrate 110 and the printed circuit board, and may further include a voltage regulator module (VRM) or a voltage generator module on the printed circuit board. The voltage regulator module may include a DC-DC converter, sense the load voltage of the package structure 10, and control the load voltage by adjusting the duty cycle, so that the package structure 10 is provided with the voltage it needs. In this implementation, the power distribution network provided by the second substrate 110 may be a portion of the second substrate 110. A portion of the power distribution network may be located on the upper surface of the second substrate 110, a portion of the power distribution network may be in the second substrate 110, and another portion of the power distribution network may be located on the lower surface of the second substrate 110. The portion of the power distribution network on the upper surface of the second substrate 110 and the portion of the power distribution network on the lower surface may be coupled together through first conductive pathways 111 penetrating through the second substrate 110. The first conductive pathways 111 are coupled to the first conductive contacts 1231 of the semiconductor device 120 to lead the electrical signal of the semiconductor device 120 out to the lower surface of the second substrate 110.

In some implementations, with reference to FIG. 1, the package structure 10 further includes second conductive contacts 130 that may protrude from the lower surface of the second substrate 110, be flush with the second substrate 110 or recessed from the lower surface toward the upper surface of the second substrate 110. The second conductive contacts 130 may be conductive balls, conductive pads or conductive pillars and the implementations of the present disclosure are not limited in shape of the second conductive contacts 130. The second conductive contacts 130 may be coupled to the conductive structures such as the interconnection layer of the second substrate 110 or the first conductive pathways 111 to lead out the electrical signal of the semiconductor device 120. The first conductive contacts 1231 may be fixed onto the printed circuit board through soldering or plugging to be coupled with the conductive contacts on the printed circuit board to enable power supply or communication of signals. In some other implementations, the second substrate 110 only provides mechanical support to the semiconductor device 120 and there is no conductive structure disposed on the two surfaces of the second substrate 110 and inside second substrate 110. Lines lead out from the lateral sides of the semiconductor device 120 as pins, which are soldered to conductive contacts of the printed circuit board to enable the interconnection of electrical signal and fixation. A recess may be disposed in the upper surface of the second substrate 110. The recess has its opening facing the positive z direction and may provide an accommodating space for the semiconductor device 120, facilitating fixation of the semiconductor device 120 to provide better protection.

Figure 2:
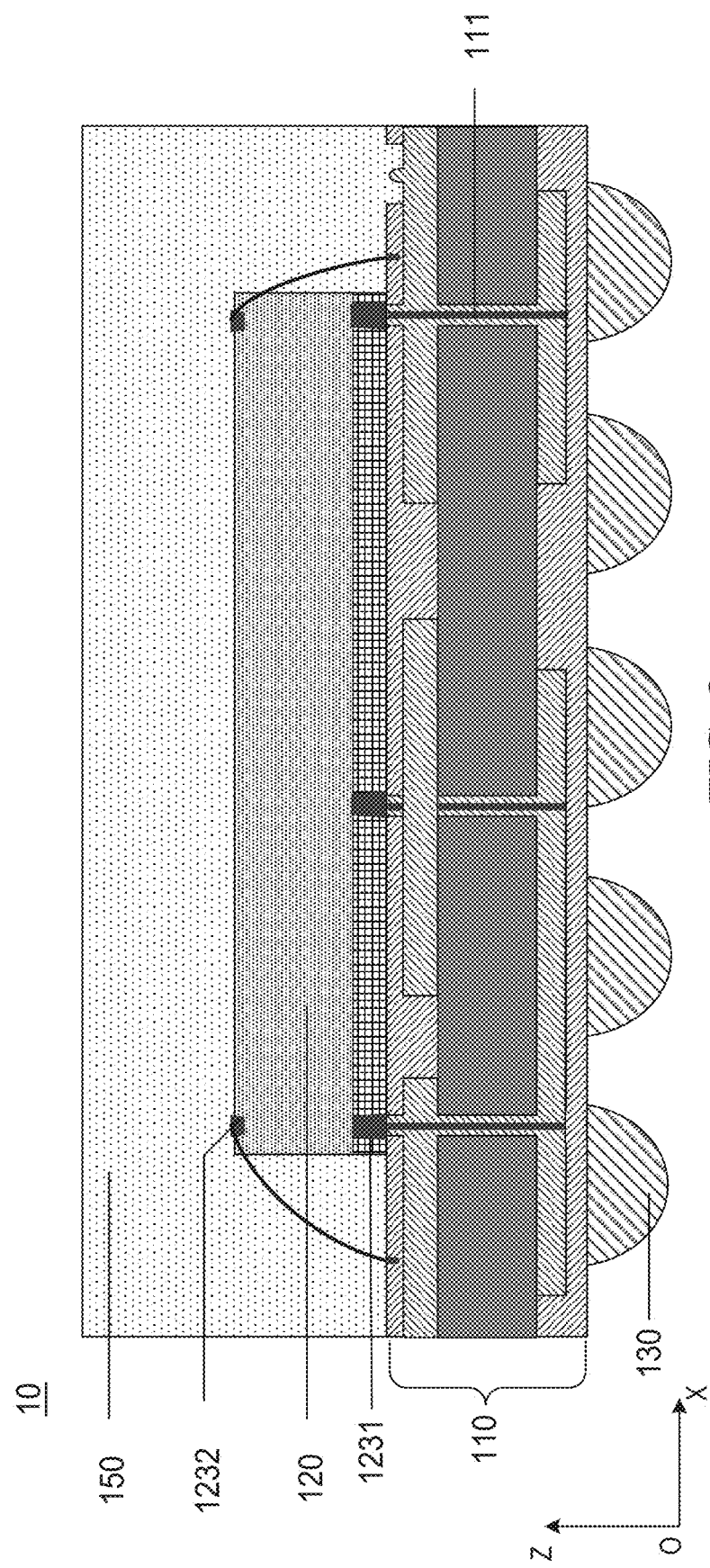
FIG. 2 is a second schematic diagram of a package structure illustrated according to an example implementation.

In some implementations, with reference to FIG. 2, a plurality of third conductive contacts 1232 are disposed on the upper surface of the semiconductor device 120 and coupled to the contacts on the second substrate 110 through leads. Illustratively, the first conductive contacts 1231, the second conductive contacts 130, the third conductive contacts 1232, the first conductive pathways 111, the leads and other conductive structures may include but are not limited to copper, gold, silver, platinum, aluminum, tungsten, chromium, nickel, titanium, tin or any other conductive material.

Figure 3:
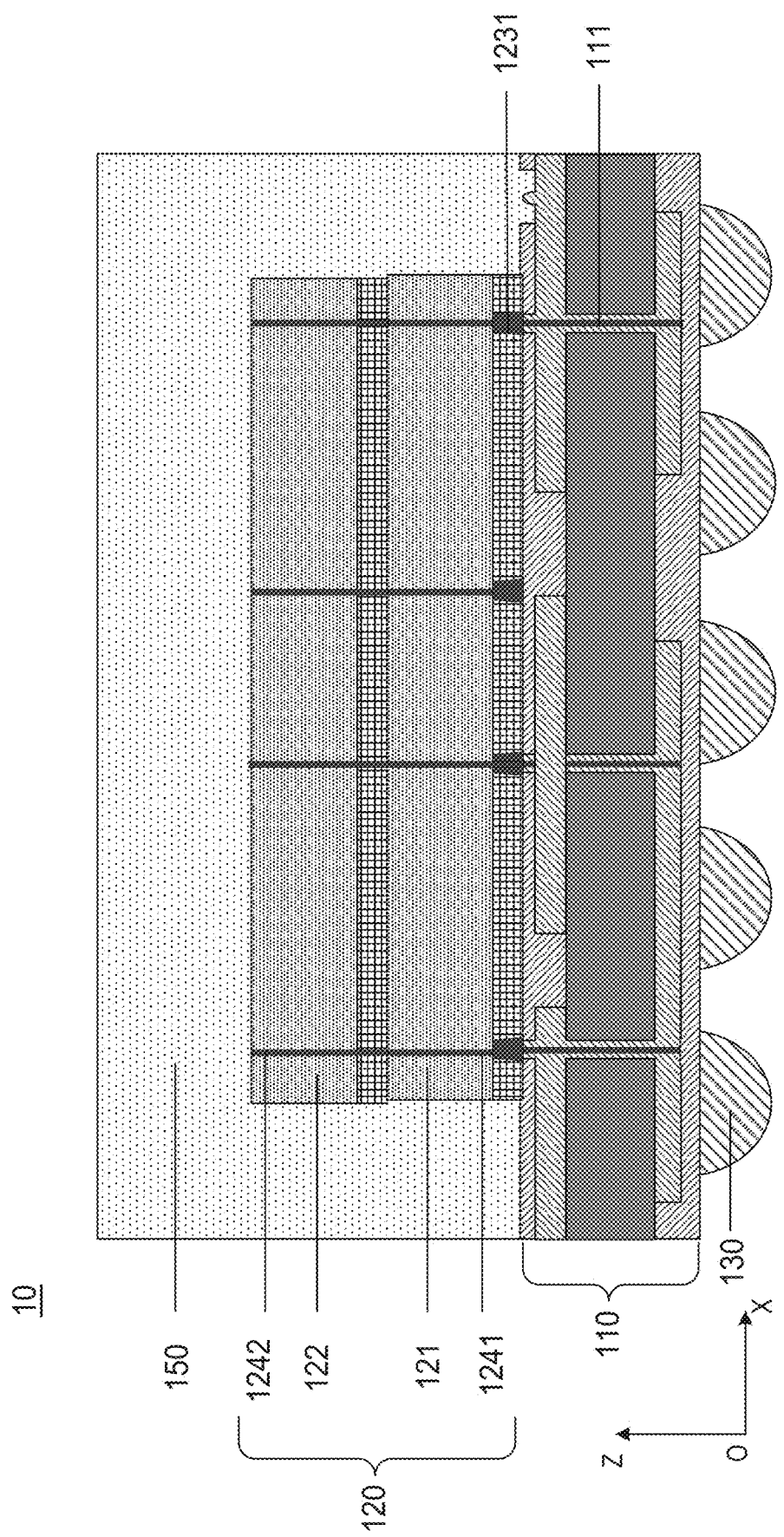
FIG. 3 is a third schematic diagram of a package structure illustrated according to an example implementation.

In some implementations, the semiconductor device 120 may include a plurality of stacked semiconductor dies. With reference to FIG. 3, the semiconductor device 120 may include a first semiconductor die 121 and a second semiconductor die 122. The first semiconductor die 121 and the second semiconductor die 122 may be bonded together via bonding layers with a plurality of bonding contacts, through which electrical signals can be communicated. The package structure 10 further includes second conductive pathways 1241 penetrating through the first semiconductor die 121 and third conductive pathways 1242 penetrating through the second semiconductor die 122. The second conductive pathways 1241 and the third conductive pathways 1242 may be coupled together through bonding contacts. The semiconductor device 120 in the implementation of the present disclosure is not limited with respect to the number and type of the stacked semiconductor dies. Three, four or even more layers of semiconductor dies may be stacked, or a plurality of semiconductor dies may be arranged laterally in the x direction.

Illustratively, the semiconductor device 120 may include one or more of the following dies: a radio frequency (RF) die, a positioning (GPS) die, a memory (DRAM) die, a memory (NAND flash) die, a blue-tooth die and a control die. Illustratively, the package structure 10 in the implementation of the present disclosure may be applied in a mobile apparatus, and may include, but not limited to, a product executing the HBM protocol, a product executing the HMC protocol, a product executing the Chiplet protocol, a product executing the UFS protocol, a product executing the eMMC protocol or a product executing other protocol.

Illustratively, the first semiconductor die 121 and the second semiconductor die 122 may both be NAND flash dies; the first semiconductor die 121 may be a DRAM die and the second semiconductor die 122 may be an NAND flash die; or the first semiconductor die 121 may be a logical die and the second semiconductor die 122 may be an NAND flash die or a DRAM die. The package structure 10 may be a system on a chip (SOC).

In some implementations, with reference to FIGS. 1 to 3, the package structure 10 further includes a covering layer 150 located over the upper surface of the second substrate 110 to wrap the semiconductor device 120 and meanwhile cover at least a portion of the upper surface of the second substrate 110. The lower surface of the semiconductor device 120 is not in contact with the covering layer 150, which covers the upper surface and lateral surfaces of the semiconductor device 120.

In some implementations, the covering layer 150 may include a single layer of insulating material such as silicon oxide, silicon nitride, silicon oxynitride, resin or another insulating material. The covering layer 150 provides protection and mechanical support to the semiconductor device 120, so as to reduce damages to the package structure 10 such as chemical erosion, mechanical compression and vibration and thus improve reliability. The covering layer 150 may include a thermally conductive material, for example, an organosilicone thermally conductive material.

In some implementations, the covering layer 150 may include multiple layers of packaging materials, for example, an insulating layer and a shielding layer with the shielding layer covering the insulating layer and the insulating layer being located between the shielding layer and the semiconductor device 120. The shielding layer may include, but not limited to, copper, gold, silver, platinum, aluminum, tungsten, chromium, nickel, titanium, tin, etc. The shielding layer may be a continuous film structure or a grid structure. The insulating layer provides mechanical support and protection to the semiconductor device 120 and the shielding layer forms a Faraday ring (or a quasi Faraday ring) surrounding the semiconductor device 120 to reduce electromagnetic interference to the semiconductor device 120 and thus improve reliability. The shielding layer may be coupled to the grounding terminal on the second substrate 110 to discharge free charges on the shielding layer through the grounding terminal, reduce the electrostatic damages, improve the reliability and facilitate the heat dissipation of the package structure 10. The covering layer 150 further includes a protecting layer covering the shielding layer to reduce oxidation of the shielding layer.

Figure 4:
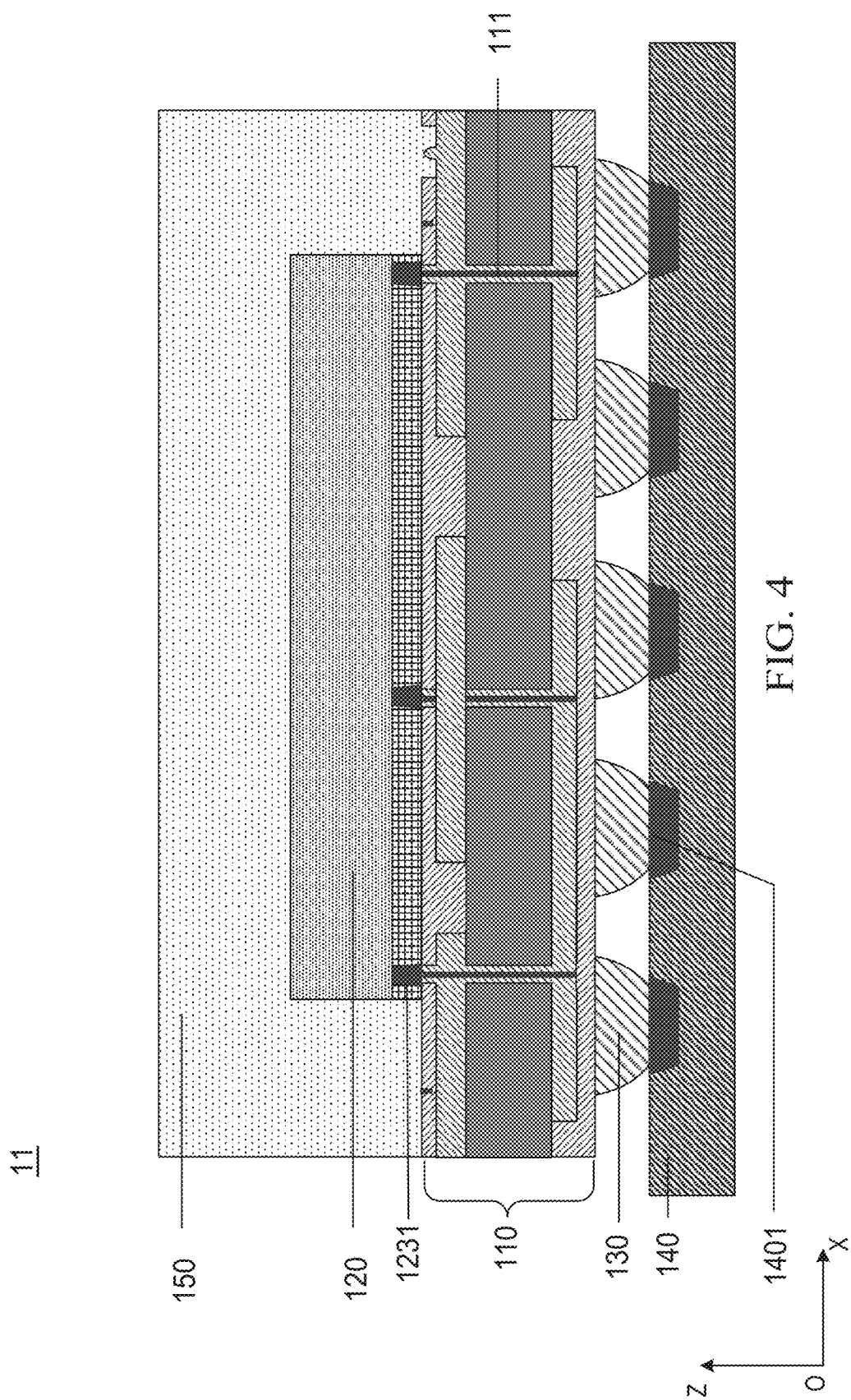
FIG. 4 is a fourth schematic diagram of an electronic device illustrated according to an example implementation.

In some implementations, a package system 11 or an electronic device 11 is provided. The electronic device 11 may include at least one instance of the package structure 10 as shown in FIGS. 1 to 3. The package structure 10 is located on a first substrate 140 that may include a printed circuit board. With reference to FIG. 4, the case, in which one package structure 10 as shown in FIG. 1 is integrated on the first substrate 140, is taken as an example. The first substrate 140 may have other package structures 10 integrated thereon and may further include an interconnection circuit, a voltage regulating module, a capacitor, a resistor, an inductor wiring terminal or other electronic element. The first substrate 140 is provided with fourth conductive contacts 1401, which are coupled to the third conductive contacts 1232 to enable interconnection of electrical signals between the package structure 10 and the first substrate 140. According to different package protocols or standards of the package structure 10, the second conductive contacts 130 may be coupled to the fourth conductive contacts 1401 to constitute a supply voltage circuit of a power distribution network for providing the voltage to the semiconductor device 120; the second conductive contact 130 may be coupled to the fourth conductive contacts 1401 to constitute a grounding circuit; the second conductive contact 130 may be coupled to the fourth conductive contacts 1401 to constitute a signal transmission link for transmission of control command signals for the semiconductor device and access request command signals from an external integrated circuit; the second conductive contact 130 may be coupled to the fourth conductive contacts 1401 to constitute a clock signal link for transmission of clock signals; and the second conductive contact 130 may be coupled to the fourth conductive contacts 1401 to constitute a data transmission link for transmission of data during reading and writing.

For the electronic device 11 including the package structure 10 and the first substrate 140, the implementations of the present disclosure will be described with a power supply circuit or a power distribution network being taken as an example. The power supply circuit may be provided for voltage supply of the package structure 10 and grounding. In some implementations, the implementations of the present disclosure provide an electronic device 11. The structural diagram of the electronic device 11 may be illustrated in FIG. 4 and the circuit diagram of the electronic device 11 may be illustrated in FIG. 5. The electronic device 11 may include: a power supply structure 170, which provides a node A and supplies voltages through the node A; a first circuit 171 having its one end coupled to the node A and the other end grounded; a package structure 10 including a second circuit 172 and a die circuit 174 that are connected in parallel between the node A and a grounding node, wherein the second circuit 172 and the first circuit 171 may be equivalent to a parallel resistor-inductor-capacitor circuit (a parallel RLC circuit).

Figure 5:
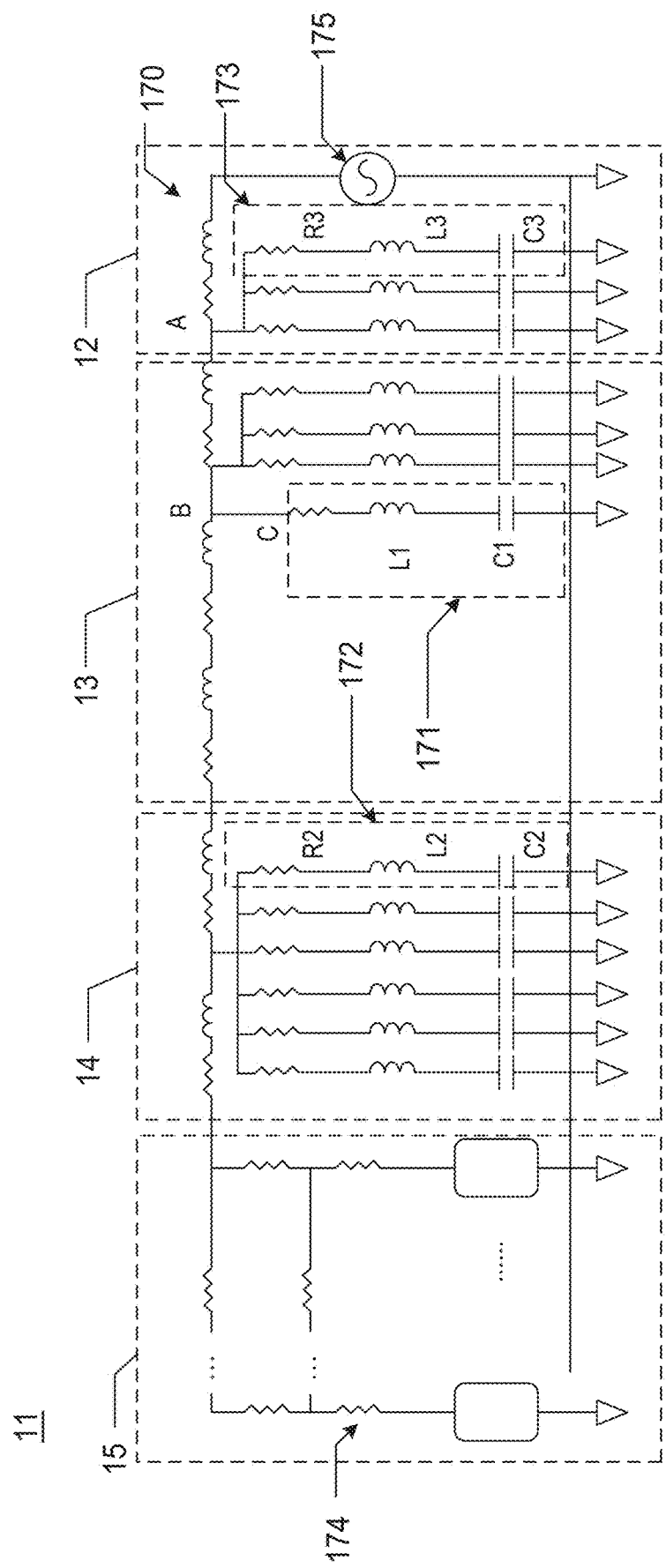
FIG. 5 is a schematic circuit diagram of an electronic device illustrated according to an example implementation.

For easy explanation, some portions of the circuits in FIG. 5 may be designated. The first portion 12 is located at a first substrate 140 (a printed circuit board), providing a power supply structure 170. The second portion 13 is located at the first substrate 140, providing a first circuit 171. The third portion 14 is located at a second substrate 110 (a packaging substrate) of the package structure 10, providing a second circuit 172. The fourth portion 15 is located at the semiconductor device 120 in the package structure 10, providing a die circuit 174. The node A is the output node A of the power supply structure 170. The first circuit 171 and the second circuit 172 are connected with the node A directly or via a resistor, a capacitor or an inductor.

With reference to FIG. 5, the power supply structure 170 may include a voltage generating circuit or a voltage regulating circuit, which modulates an AC source or a DC source into a voltage needed by the package structure 10 and supplies the voltage to the package structure 10, wherein the voltage is output through the node A. The first circuit 171 may include a series resistor-inductor-capacitor circuit (a series RLC circuit). The first circuit 171 may include a series inductor-capacitor circuit (a series LC circuit). A plurality of the first circuit 171 may be connected in parallel between the node A of the second portion 13 and the grounding node. The second circuit 172 may be located on and/or in the second substrate 110, and may include a series RLC circuit. Illustratively, the first circuit 171 and the second circuit 172 may be applied to select a signal of a particular frequency and inhibit signals of other frequencies by adapting values of the resistors, inductors and capacitors.

The internal circuit of the semiconductor device 120 in the package structure 10 may be illustrated as the die circuit 174 also referred to as a main IC and the semiconductor device 120 may include a plurality of the die circuit 174. For package structures 10 using different package protocols, voltages needed by the die circuit 174 may be different. With the eMMC protocol being taken as an example, the semiconductor device 120 in the eMMC product may include a memory controller and a memory device. The memory controller is coupled to and controls the memory device and the memory device may include an NAND flash. The power supply voltages for the eMMC product may include an IO voltage VCCQ and an NAND CORE voltage VCC. The VCCQ may supply power to the memory controller and the MMC IO interface between the memory controller and a host. The VCC may supply power to the NAND flash and the NAND IO interface between the memory controller and the NAND flash. The VCCQ and VCC supply power to the internal semiconductor device of the package structure 10 through the coupling between the package structure 10 and the second substrate 110 and other voltages for the internal devices of the NAND flash may be generated through modulation by an internal voltage generator. The VCCQ may have a voltage range of 1.1V~3.6V and the VCC may have a voltage range of 1.7V~3.6V. The VCC voltage is higher than the VCCQ voltage. The clock frequency of the eMMC product may be in the range of 0~200 MHz. The node A in FIG. 5 only provides one voltage for the die circuit 174, for example, the VCCQ or VCC. The VCCQ and VCC are the voltages obtained from the supply voltage of the node A through voltage depressurization, filtering and denoising rather than the original voltage output from the node A. Different voltages may be provided by different voltage nodes.

Figure 6:
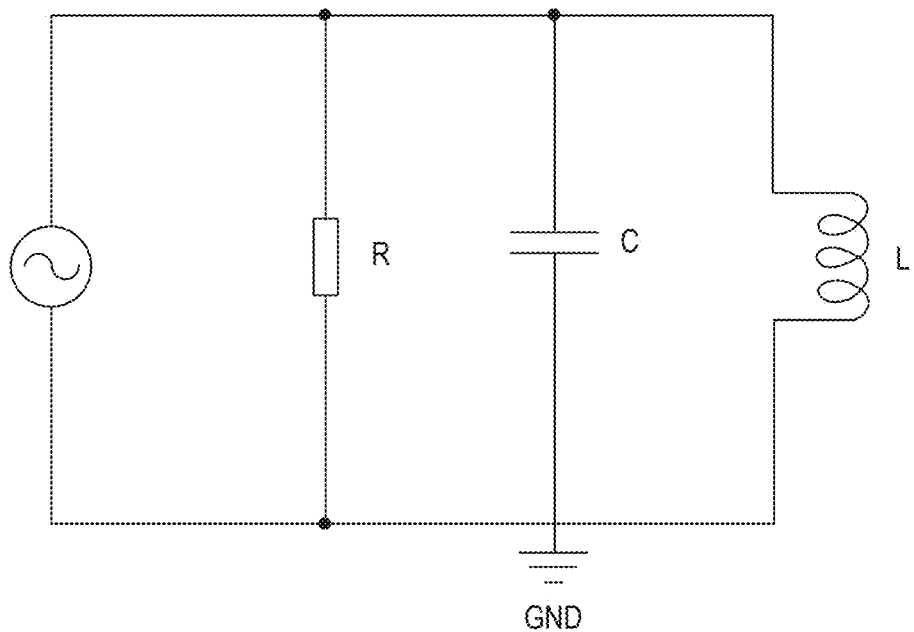
FIG. 6 is an equivalent diagram of an electronic device illustrated according to an example implementation.
Figure 7:
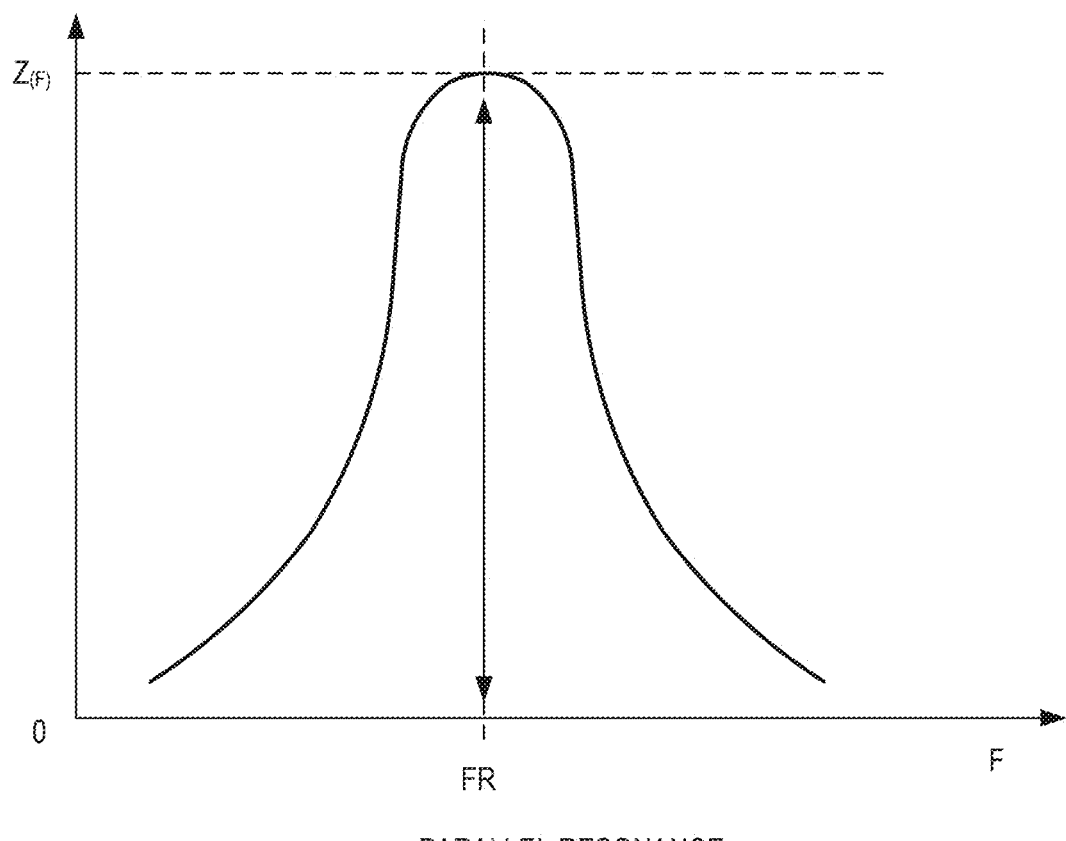
FIG. 7 is a curve chart illustrating resistance vs. frequency according to an example implementation.

In some implementations, the circuits in FIG. 5 excluding the die circuit 174, e.g., the circuit of the power supply structure 170, the first circuit 171 and the second circuit 172 may be equivalent to a parallel RLC circuit, which can select a signal of a particular frequency and inhibit signals of other frequencies by adjusting values of the resistors, inductors and capacitors to improve the stability of power supply of the die circuit 174. The schematic diagram of the parallel RLC circuit may be illustrated in FIG. 6. The (overall) resistance of the parallel RLC circuit may vary with frequency. When the resonant frequency of the inductors and capacitors matches the frequency of an input signal, the circuit resistance is maximized and at this time parallel resonance occurs. With reference to FIG. 7, the correspondence relationship between resistance Z and frequency is illustrated, and the frequency corresponding to occurrence of the maximum resistance or the peak value of resistance is the parallel resonant frequency fr. In the RLC parallel circuit, the quality factor Q of the circuit is related to values of resistance, inductance and capacitance, e.g., the quality factor $Q=1/R*(L/C)^{1/2}$. In a power supply or command signal circuit, the higher the value of Q is, the steeper the characteristic curve is in the pass band and the easier it is for the ringing phenomenon to occur. As a result, the signals that pass through the circuit are liable to distortion. Moreover, the resistance of the circuit reaches its peak value in the vicinity of the resonant frequency, which causes drop of the output current at the same frequency. However, the power supply circuit needs stable transmission of voltage rather than a relatively significant resonance phenomenon. The Q value may be reduced by connecting another resistor in series to the resistance end of the parallel RLC circuit or increasing the resistance value to reduce oscillation of the power supply circuit and reduce the circuit resistance.

According to some aspects of implementations of the present disclosure, an electronic device 11 is provided. The structural diagram of the electronic device 11 may be illustrated in FIG. 4 and the circuit diagram of the electronic device 11 may be illustrated in FIG. 8. The electronic device 11 may include: a power supply structure 170, which includes a node A and supplies voltages through the node A; a first circuit 171 having its one end coupled to the node A via a first resistor R1 and the other end grounded; a package structure 10 including a second circuit 172 and a die circuit 174 that are connected in parallel between the node A and a grounding node, wherein the second circuit 172, the first circuit 171 and the first resistor R1 may be equivalent to a parallel resistor-inductor-capacitor circuit.

The power supply structure 170 may be provided by a first substrate 140 (a printed circuit board) and may include a voltage generating circuit, which modulates an AC source or a DC source into a voltage needed by the package structure 10 and supplies the voltage to the package structure 10 with the voltage being output through the node A. The first circuit 171 is provided by the first substrate 140, may include a series RLC circuit or a series LC circuit and is connected to the node A after being connected with the first resistor R1 in series. The second circuit 172 is provided by the second substrate 110 of the package structure 10, may be located on and/or in the second substrate 110 and may include the series RLC circuit. The first circuit 171 has its one end connected to the node A via the first resistor R1 and the other end be grounded. In an example, one electrode of a first capacitor C1 in the first circuit may be grounded. The second circuit 172 includes a second resistor R2, a second inductor L2 and a second capacitor C2 connected in series, and the second capacitor C2 has its one electrode grounded. The circuit composed of the first circuit 171 and the first resistor R1 connected in series is connected with the second circuit 172 in parallel, forming a parallel RLC circuit for supplying power to the die circuit 174. The first resistor R1 increases the overall resistance of the first circuit 171, lowers the quality factor Q of the parallel RLC circuit, reduces oscillation of the power supply circuit and reduces the circuit resistance. The first resistor R1 may be disposed flexibly on the printed circuit board to avoid modification to the second circuit 172 and the die circuit 174 in the package structure 10 and reduce damages to the package structure 10.

In some implementations, a plurality of the first circuit 171 may be connected in parallel between the node A and the grounding node and the first resistor R1 may be connected in series with the one of the plurality of first circuits 171 nearest to the second circuit 172. As shown in FIG. 5, the plurality of first circuits 171 are between the node A and the grounding node and the first circuit 171 is a series RLC circuit. The first resistor R1 may be connected with one series RLC circuit that is nearest to the second circuit 172 and then be connected to the node A. The first resistor R1 may be coupled between the B terminal and the C terminal.

Figure 9:
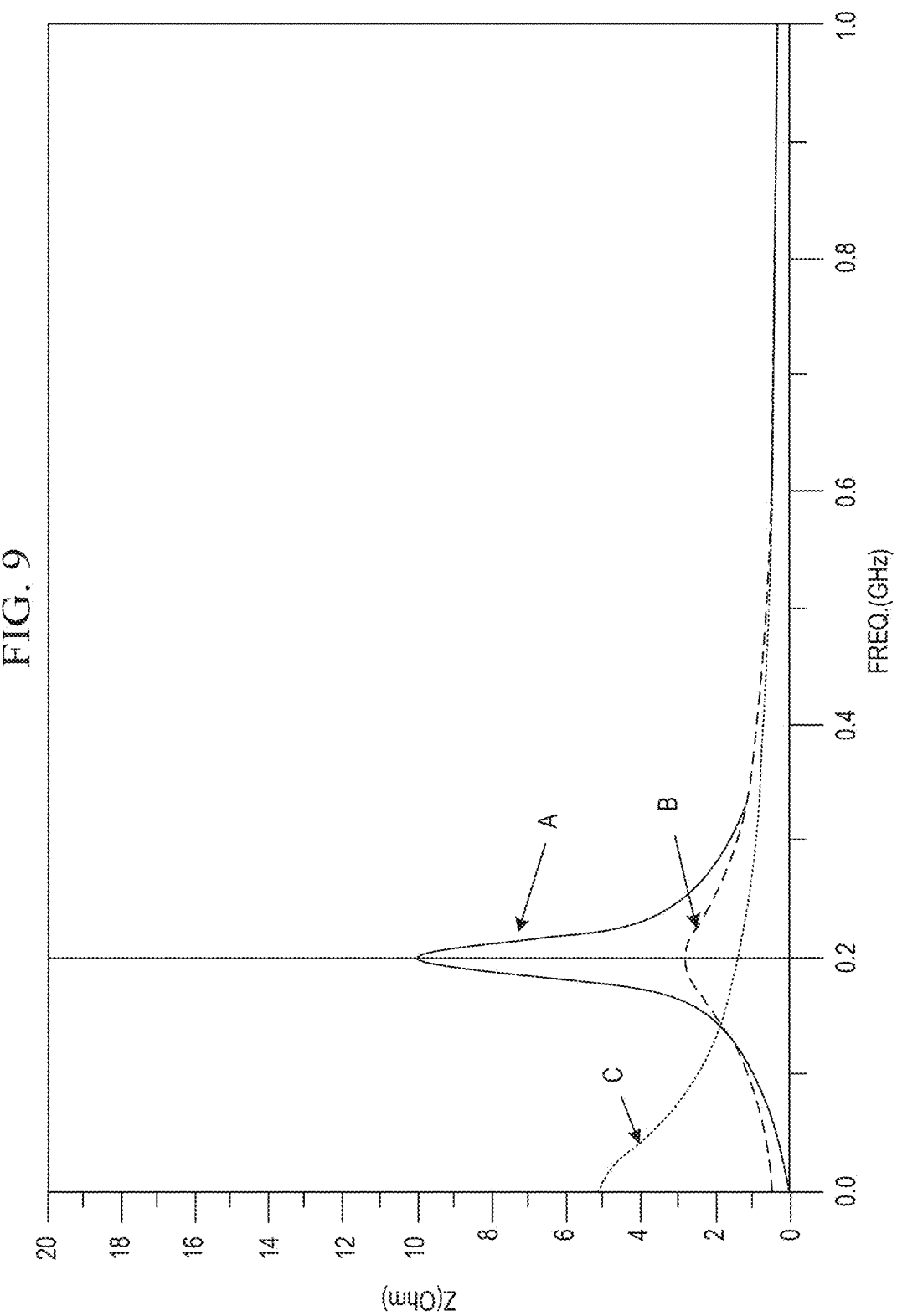
FIG. 9 is a curve chart illustrating a resistance test of an electrical device illustrated according to an implementation of the present disclosure.

In some implementations, during a test for an eMMC product, its VCCQ power supply circuit has a resonance point with a relatively large resonance amplitude in the vicinity of 200 MHZ, causing relatively large amplitudes of oscillation of IO signal. A resistor of 0.5 Ohm may be added in series to the first circuit 171 nearest to the second circuit 172 in the package structure 10 to reduce the resonance amplitude at 200 MHz and resistance. With reference to FIG. 9, for different resistance values of the first resistor R1, a curve chart of resistance vs. frequency is illustrated. The curve A is the resistance vs. frequency curve when the first resistor R1 is 0, e.g., no first circuit R1 is added. The curve B is the resistance vs. frequency curve when the first circuit R1 is 0.5 Ohm. The curve C is the resistance vs. frequency curve when the first circuit R1 is 5 Ohm. In FIG. 9, when no first resistor R1 is added, the curve A has its peak value of resistance occur at 200 MHz and the peak shape of the variation curve A of resistance is relatively steep and the variation of resistance is relatively large, causing a relatively large amplitude jitter of voltage transmission; when a first resistor R1 of 0.5 Ohm is added, the peak resistance occurs at 200 MHz and is reduced, the peak shape of the variation curve B of resistance is relatively smooth, and the variation of resistance is relatively small, so that the amplitude jitter of voltage transmission is relatively small and more stable voltage transmission is enabled; When the resistance value of the first resistor R1 is increased to 5 Ohm, the low-frequency resistance within the range of 0~200 MHz is elevated with respect to the case of 0.5 Ohm, but is lower than the peak resistance when no first resistor R1 is added, the DC component in a low frequency band is lower than that in the case of 0.5 Ohm and the DC component in a high frequency band is higher than that in the case of 0.5 Ohm. In the implementations of the present disclosure, the resistance value of the first resistor R1 may be set according to the package protocol of the package structure 10 in conjunction with stimulation and tests to reduce the peak resistance corresponding to the resonant frequency, improve stability of power supply, lower the oscillation amplitude and reduce interference to other circuits to improve stability of power supply.

In an implementation of the present disclosure, one end of the first circuit 171 is coupled to the node A of the power supply structure 170 via the first resistor R1, and the second circuit 172 and the die circuit 174 are connected in parallel between the node A and the grounding node; the node A supplies the voltage to power the package structure 10, enabling the die circuit 174 in the package structure 10 to give play to the device functions of control, storage, communication and the like. The second circuit 172, the first circuit 171 and the first resistor R1 may be equivalent to a parallel resistor-inductor-capacitor circuit (a parallel RLC circuit). The first resistor R1 is configured to reduce the quality factor of the equivalent parallel RLC circuit, reduce oscillation of the power supply circuit and in turn the interference to the die circuit 174, reduce the resistance of the die circuit 174 and improve the reliability of power supply for the die circuit 174.

In some implementations, the first circuit 171 includes a first capacitor C1 and a first inductor L1 connected in series. The first circuit 171 may include a series CL circuit including a first capacitor C1 and a first inductor L1 connected in series with one electrode of the first capacitor C1 grounded. The first circuit 171 may include the series RLC circuit as shown in FIG. 5. The first circuit 171 includes a resistor, a first inductor L1 and a first capacitor C1 connected in series with one electrode of the first capacitor C1 grounded.

Figure 8:
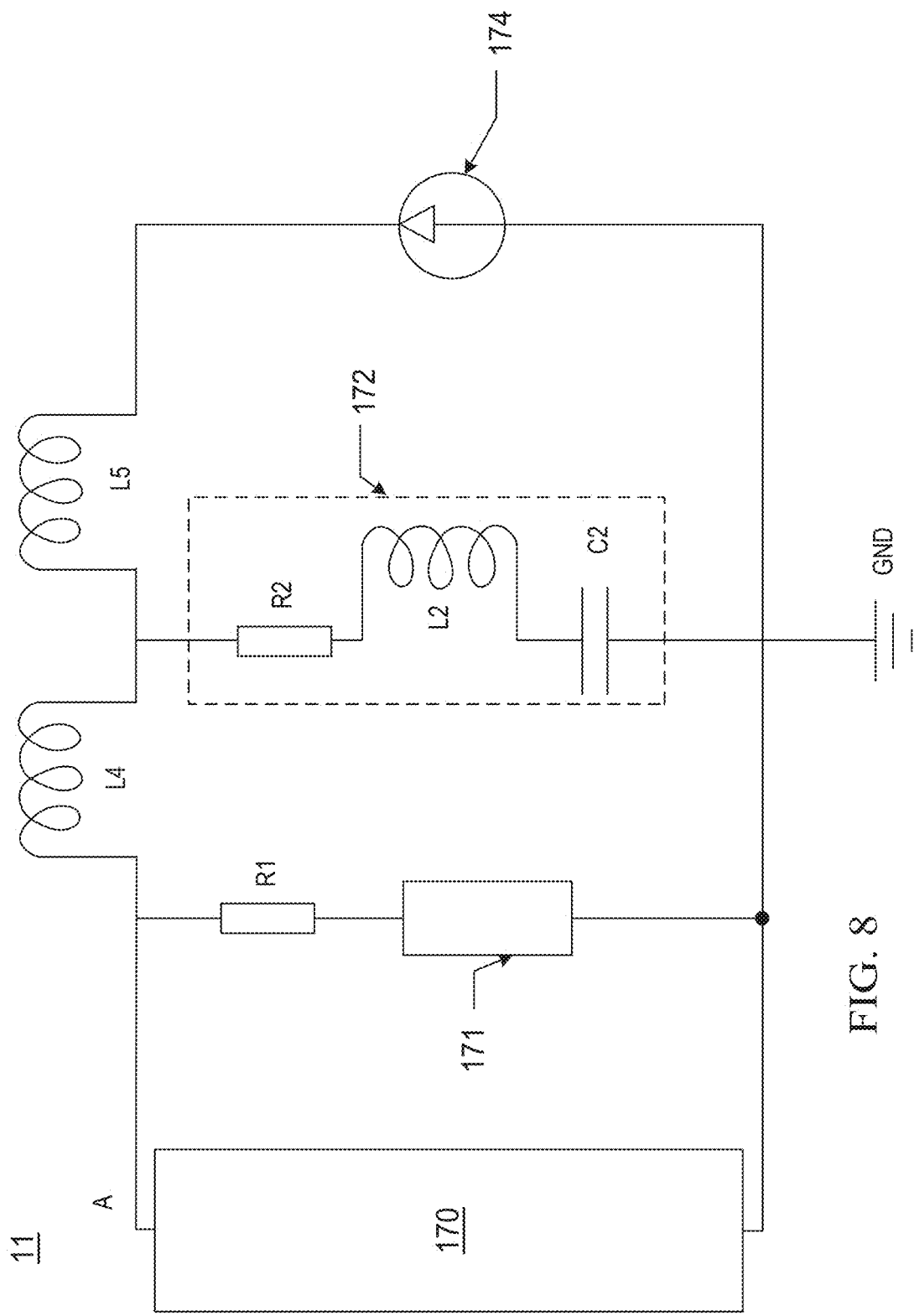
FIG. 8 is an equivalent diagram of an electronic device according to an implementation of the present disclosure.

In some implementations, the electronic device 11 includes: a plurality of first circuits 171 connected in parallel, and a first resistor R1 connected in series with one of the plurality of first circuits 171 nearest to the second circuit 172. FIG. 8 shows one first circuit 171 and one first resistor R1 connected with the first circuit 171 in series. FIG. 5 shows a plurality of first circuits 171 connected in parallel between the node A and the grounding node and the first circuit 171 is a series RLC circuit. One series RLC circuit that is nearest to the second circuit 172 is connected in series with the first resistor R1 first and then connected with the node A. The first resistor R1 may be coupled between the B terminal and the C terminal.

In some implementations, the second circuit 172 includes a second resistor R2, a second inductor L2 and a second capacitor C2 that are connected in series; one end of the second circuit 172 is coupled to the node A and the other end of the second circuit 172 is grounded. FIG. 8 shows one second circuit 172, while FIG. 5 shows a plurality of second circuits 172 connected in parallel. One electrode of the second capacitor C2 in the second circuit 172 is grounded.

In some implementations, with reference to FIG. 5, the power supply structure further includes a third circuit 173 having its one end coupled to the node A and the other end grounded. The third circuit 173 is connected with the first circuit 171 in parallel and includes a third resistor R3, a third inductor L3 and a third capacitor C3 connected in series. With reference to FIG. 5, the third circuit 173 may be provided for voltage stabilization and denoising. There may be a plurality of third circuits 173 connected in parallel. One electrode of the third capacitor C3 is grounded.

In some implementations, the power supply structure 170 further includes a voltage generating circuit having its output terminal coupled to the node A. The voltage generating circuit provides voltages and inputs the voltages to the node A and the voltage generating circuit is equivalent to the power source of the circuit in FIG. 5. In the implementations of the present disclosure, a symbol for power source is configured to identify the voltage generating circuit 175. The voltage generating circuit steps down and modulates the external large current to provide DC or AC voltages satisfying the package protocol, and output the voltages to the node A via the resistor, inductor and capacitor.

In some implementations, with reference to FIG. 8, the electronic device 11 further includes a fourth inductor L4, through which one end of the second circuit 172 is coupled to the node A.

In some implementations, with reference to FIG. 8, the package structure 10 further includes a fifth inductor L5, through which the die circuit 174 is coupled to the node A. The inductors are configured for filtering, and eliminating or reducing interference caused by noises of other circuits or for blocking alternating currents, improving reliability of transmission for power supply.

In some implementations, the first resistor R1 has a resistance value in the range of 0.5 Ohm~5 Ohm, and the operating frequency of the die circuit 174 is in the range of 0~300 MHz. The operating frequency of the die circuit 174 may be set according to the related package protocol, for example, the operating frequency of an eMMC product may be in the range of 0~200 MHz. The first resistor R1 may be adapted according to its operating frequency range to make the resonant frequency, at which the peak value of resistance occurs, fall within the target range of operating frequency, lowering the peak resistance. For example, FIG. 9 shows an eMMC product, in which the first resistor R1 may be selected to be 0.5 Ohm so as to reduce the peak resistance and the oscillation amplitude.

In some implementations, with reference to FIG. 4, the electronic device 11 further includes a first substrate 140 on which the power supply structure 170 is located. The package structure 10 further includes a second substrate 110, and the second circuit 172 is located on and/or in the second substrate 110 and the die circuit 174 is located on the second substrate 110. The surface of the first substrate 140 on the side having the first circuit 171 disposed thereon is fixed to the surface of the second substrate 110 on the side away from the die circuit 174.

In some implementations, with reference to FIG. 4, the package structure 10 further includes a semiconductor device 120 that includes the die circuit 174 and is located on the second substrate 110.

The semiconductor device 120 may include a plurality of dies. One of the dies may correspond to one die circuit 174 including, for example, a memory controller and a memory device. The memory controller and the memory device may respectively correspond to one die circuit 174. The second circuit 172 is provided by the second substrate 110 and may include a wiring layer on the upper surface of the second substrate 110, conductive pathways penetrating through the second substrate 110 and the wiring layer on the lower surface of the second substrate 110.

According to some aspects of an implementation of the present disclosure, a power supply circuit is provided, the power supply circuit including: a node A, through which the package structure 10 is supplied with power; and a first circuit 171 having its one end coupled to the node A via a first resistor R1 and the other end grounded, wherein the package structure 10 includes a second circuit 172 and a die circuit 174 that are connected in parallel between the node A and a grounding node, and the second circuit 172, the first circuit 171 and the first resistor R1 may be equivalent to a parallel resistor-inductor-capacitor circuit. The power supply circuit in the implementation of the present disclosure is different from the power supply structure 170 described above and with reference to FIG. 5 may include circuits for supplying power to the die circuit 174 including circuits in the power supply structure 170, e.g., the circuits including the first circuit 171, the second circuit 172, the third circuit 173, the voltage generating circuit 175, and other devices such as resistors, inductors, capacitors, transistors, and may include other circuits on the first portion 12, the second portion 13 and the third portion 14 in the circuits in FIG. 5.

In some implementations, the first circuit 171 includes a first capacitor C1 and a first inductor L1 connected in series.

In some implementations, the power supply circuit includes a plurality of first circuits 171 connected in parallel, and a first resistor R1 is connected in series with one of the plurality of first circuits 171 nearest to the second circuit 172.

In some implementations, the second circuit 172 includes a second resistor R2, a second inductor L2 and a second capacitor C2 that are connected in series; one end of the second circuit 172 is coupled to the node A and the other end of the second circuit 172 is grounded.

In some implementations, the power supply circuit further includes a third circuit 173 having its one end coupled to the node A and the other end grounded. The third circuit 173 is connected with the first circuit 171 in parallel and includes a third resistor R3, a third inductor L3 and a third capacitor C3 connected in series.

In some implementations, the power supply circuit further includes a voltage generating circuit, whose an output terminal is coupled to the node A.

In some implementations, the power supply circuit further includes a fourth inductor L4, through which one end of the second circuit 172 is coupled to the node A.

In some implementations, the package structure 10 further includes a fifth inductor L5, through which the die circuit 174 is coupled to the node A.

In some implementations, the first resistor R1 has a resistance value in the range of 0.5 Ohm~5 Ohm, and the operating frequency of the die circuit 174 is in the range of 0~300 MHz.

According to some aspects of implementations of the present disclosure, an electronic system is provided by the implementation of the present disclosure, the electronic system including the electronic device 11 or the package system 11 as illustrated in FIG. 4. The electronic device may include one or more package structures, each of which may include at least one of a memory device 104 or a memory controller 106.

Figure 10:
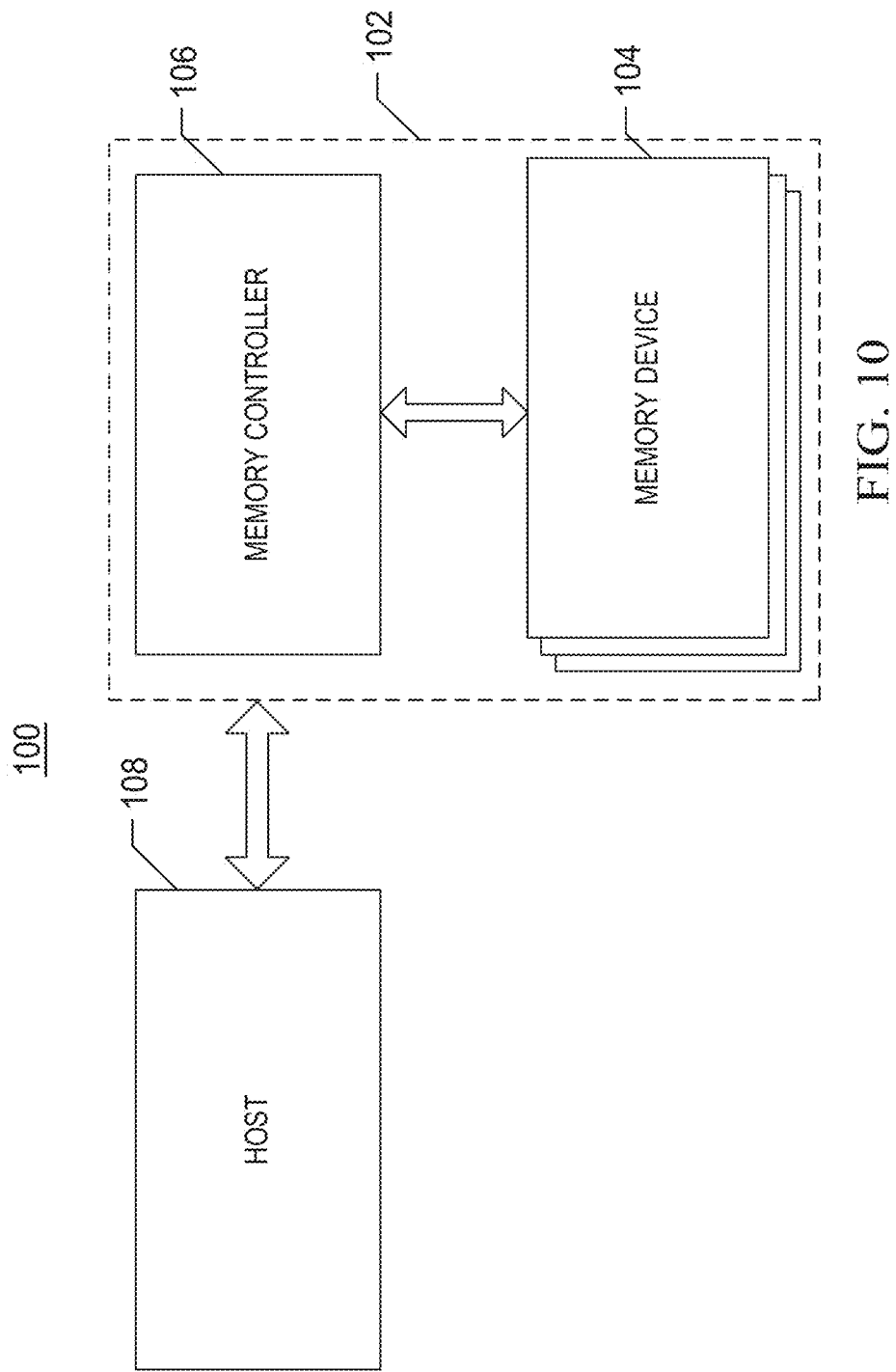
FIG. 10 is a schematic diagram of an example system illustrated according to an implementation of the present disclosure.

FIG. 10 provides a memory system 102 including a package structure 10. The semiconductor device 120 includes at least one of a memory device 104 or a memory controller 106 that is coupled to the memory device 104 and is configured to control the memory device 104.

In some implementations, the memory controller 106 and the memory device 104 may be packaged into two package structures 10 respectively, which are integrated onto a printed circuit board to constitute a package system 11. The printed circuit board may further include other electronic elements. The package system 11 acts as the memory system 102. The memory system 102 in this implementation may further include a memory card or an SSD product. In this implementation, the electronic device may be an SSD product and the electronic system may be a system 100 including a host 108.

In some other implementations, the memory device 104 and the memory controller 106 may be packaged into one package structure 10 that acts as the memory system 102. The memory system 102 in this implementation may include a universal flash storage (UFS) package or an eMMC package product. In this implementation, the electronic device 11 may be an electronic product, in which a UFS or an EMMC product is applied and may be a system 100 including, but not limited to, a mobile phone etc. Alternatively, the electronic device 11 may be other memory products and the electronic system may be a data center, a cloud storage server, a vehicle, an artificial intelligence terminal product, an intelligent household appliance or the like, in which this type of memory products can be applied.

The memory device 104 in implementations of the present disclosure includes, but not limited to, a 3D NAND memory and description is given with the 3D NAND memory taken as an example for easy understanding.

FIG. 10 shows a block diagram of an example system 100 having a memory device in accordance with some aspects of the present disclosure. The system 100 may be a mobile phone, a desktop computer, a laptop computer, a tablet computer, a vehicle computer, a game console, a printer, a locating apparatus, a wearable electronic apparatus, a smart sensor, a virtual reality (VR) apparatus, an augmented reality (AR) apparatus and any other suitable electronic apparatus having a storage therein. As shown in FIG. 10, the system 100 may include a host 108 and a memory system 102 that includes one or more memory devices 104 and a memory controller 106. The host 108 can be a processor of an electronic device such as a central processing unit (CPU), or a system-on-chip (SoC) such as an application processor (AP). The host 108 may be configured to send data to the memory device 104 or receive data from the memory device 104.

According to some implementations, the memory controller 106 is coupled to the memory device 104 and the host 108 and is configured to control the memory device 104. The memory controller 106 can manage the data stored in the memory device 104 and communicate with the host 108. In some implementations, the memory controller 106 is designed for operating in a low duty-cycle environment like a secure digital (SD) card, a compact flash (CF) card, a universal serial bus (USB) flash drive, or other medium for use in an electronic device such as a personal computer, a digital camera, a mobile phone, etc. In some implementations, the memory controller 106 is designed for operating in a high duty-cycle environment like an SSD or an embedded multi-media-card (eMMC), used as a data storage for a mobile device such as a smart phone, a tablet computer or a laptop computer, and an enterprise storage array.

The memory controller 106 can be configured to control operations of the memory device 104, such as read, erase, and programming operations. The memory controller 106 can also be configured to manage various functions with respect to the data stored or to be stored in the memory device 104, including but not limited to bad-block management, garbage collection, logical-to-physical address conversion, wear leveling and the like. In some implementations, the memory controller 106 may be further configured to process error correction codes (ECCs) with respect to the data read from or written to the memory device 104. Any other suitable functions can be performed by the memory controller 106 as well, for example, formatting the memory device 104. The memory controller 106 can communicate with an external device (e.g., the host 108) according to a particular communication protocol. For example, the memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc. The voltage VCCQ provided by the power supply circuit in implementations of the present disclosure may supply power to the memory controller 106. The voltage VCCQ may supply power to a communication interface executing the above-described interface protocol between the host 108 and the memory controller 106.

Figure 11B:
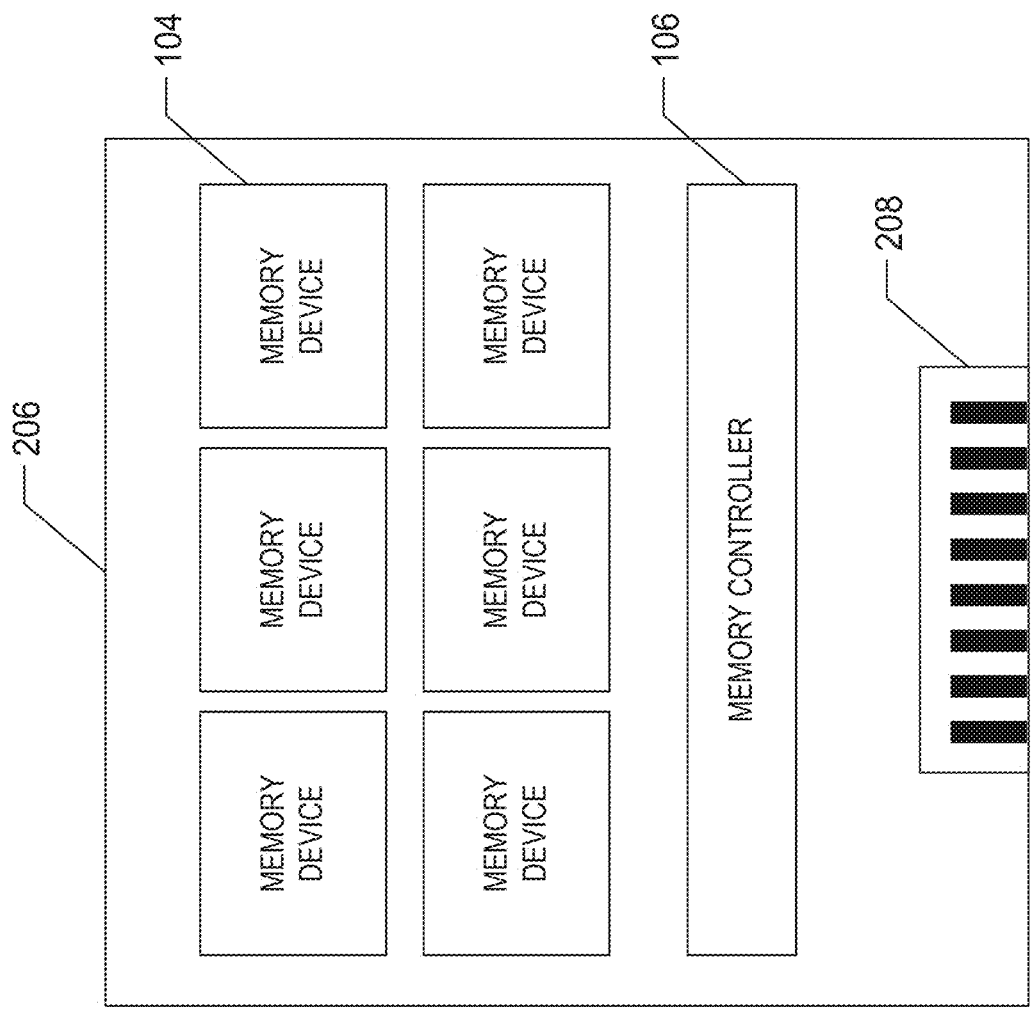
FIG. 11B is a schematic diagram of an example solid state drive (SSD) illustrated according to an implementation of the present disclosure.
Figure 11A:
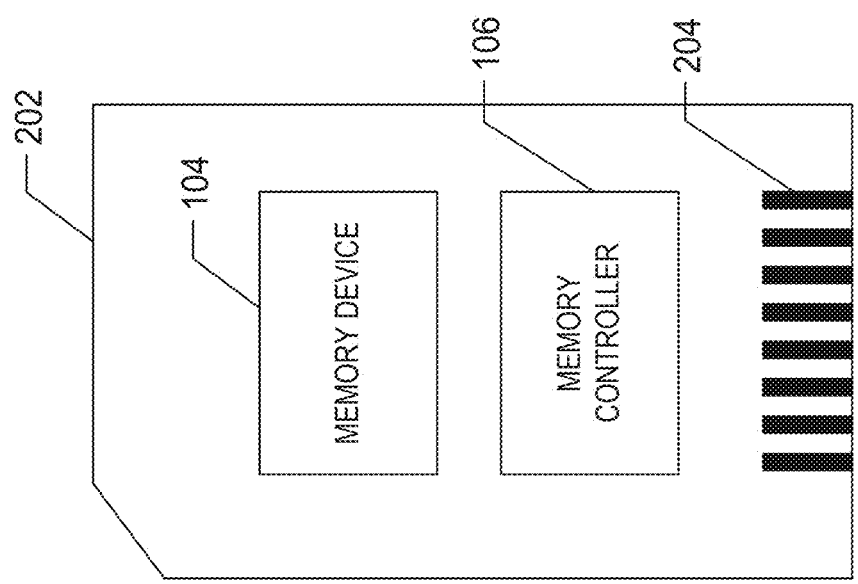
FIG. 11A is a schematic diagram of an example memory card illustrated according to an implementation of the present disclosure.

The memory controller 106 and one or more memory devices 104 can be integrated into various types of storage apparatuses, for example, be included in the same package, such as a universal Flash storage (UFS) package or an eMMC package. That is, the memory system 102 can be implemented and packaged into different types of end electronic products. In one example as shown in FIG. 11A, the memory controller 106 and a single memory device 104 can be integrated into a memory card 202. The memory card 202 may include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. The memory card 202 may further include a memory card connector 204 coupling the memory card 202 with a host, e.g., the host 108 in FIG. 10. In another example shown in FIG. 11B, the memory controller 106 and a plurality of memory devices 104 may be integrated into an SSD 206. The SSD 206 may also include an SSD connector 208 coupling the SSD 206 with a host (e.g., the host 108 in FIG. 10). In some implementations, at least one of the storage capacity or the operation speed of the SSD 206 are greater than those of the memory card 202.

Figure 12:
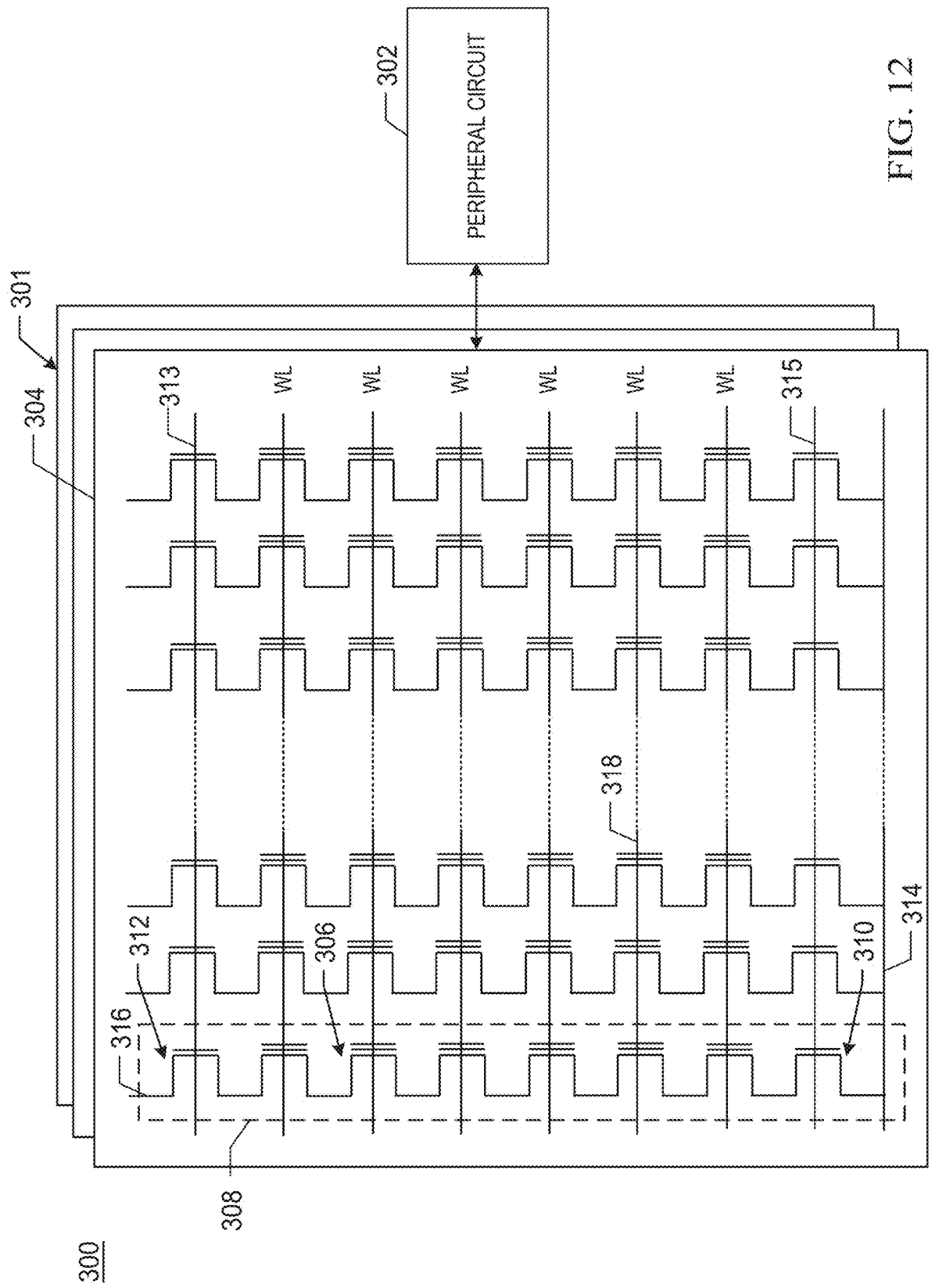
FIG. 12 is a schematic diagram of an example memory device illustrated according to an implementation of the present disclosure.

FIG. 12 shows a schematic circuit diagram of an example memory device 300 including a peripheral circuit in accordance with some aspects of the disclosure. The memory device 300 may be an example of the memory device 104 in FIG. 10. The memory device 300 may include a memory cell array 301 and the peripheral circuit 302 coupled to the memory cell array 301. When description is given with a 3D NAND memory cell array taken as an example of the memory cell array 301, memory cells 306 are provided in the form of an array of NAND memory strings 308 each extending vertically above a substrate (not shown). In some implementations, each NAND memory string 308 includes a plurality of memory cells 306 coupled in series and stacked vertically. Each memory cell 306 can retain a continuous analog value, for example, a voltage or charges, depending on the number of electrons trapped in the region of the memory cell 306. Each memory cell 306 may be a memory cell of a floating-gate type that includes a floating-gate transistor, or a memory cell of a charge trapping type that includes a charge trapping transistor.

In some implementations, each memory cell 306 may be a single-level cell (SLC) that has two possible memory states and thus can store one bit of data. For example, the first memory state "0" may correspond to a first voltage range, and the second memory state "1" may correspond to a second voltage range. In some implementations, each memory cell 306 is a multi-level cell (MLC) that is capable of storing more than single bit of data in more than four memory states. For example, the MLC may store two bits per cell, three bits per cell (also known as a triple-level cell (TLC)), or four bits per cell (also known as a quad-level cell (QLC)). Each MLC may be programmed to assume a range of possible nominal storage values. In an example, if each MLC stores two bits of data, the MLC may be programmed to write one of three possible nominal storage values into the cell, while the fourth nominal storage value other than the three nominal storage values may be configured to represent an erased state.

As shown in FIG. 12, each NAND memory string 308 may include a bottom select gate (BSG) 310 at its source end and a top select gate (TSG) 312 at its drain end. The BSG 310 and the TSG 312 may be configured to activate a selected NAND memory string 308 during a read operation and a programming operation. In some implementations, sources of the NAND memory strings 308 in the same memory block 304 are coupled together through the same source line (SL) 314 (e.g., a common SL). For example, in accordance with some implementation, all the NAND memory strings 308 in the same memory block 304 have an array common source (ACS). According to some implementations, the TSG 312 of each NAND memory string 308 is coupled to a corresponding bit line (BL) 316 and data can be read from or written to the bit line 316 through an output bus (not shown). In some implementations, each NAND memory string 308 is configured to be selected or deselected by applying a select voltage (e.g., a voltage higher than the threshold voltage of the transistor having the TSG 312) or a deselect voltage (e.g., 0V) to the corresponding TSG 312 through one or more TSG lines 313 and/or applying the select voltage (e.g., a voltage higher than the threshold voltage of the transistor having the BSG 310) or the deselect voltage (e.g., 0V) to the corresponding BSG 310 through one or more BSG lines 315.

As shown in FIG. 12, the NAND memory strings 308 can be organized into a plurality of memory blocks 304, each of which may have a common source line 314 (e.g., coupled to the ground). In some implementations, each memory block 304 is a basic data unit for an erase operation. That is, all the memory cells 306 in the same memory block 304 can be erased simultaneously. In order to erase the memory cells 306 in a selected memory block 304a, an erase voltage (Vers), for example, a high positive voltage (e.g., 20V or higher) is bias coupled to the source lines 314 of the selected memory block 304a and the unselected memory blocks 304b in the same plane as the selected memory block 304a. It is understood that, in some examples, an erase operation may be performed at a half-memory-block level, a quarter-memory-block level, or a level having any suitable number of memory blocks or any suitable fraction of memory block. Memory cells 306 of adjacent NAND memory strings 308 can be coupled through the word line 318 that selects which row of memory cells 306 is affected by the read and programing operations.

Figure 13:
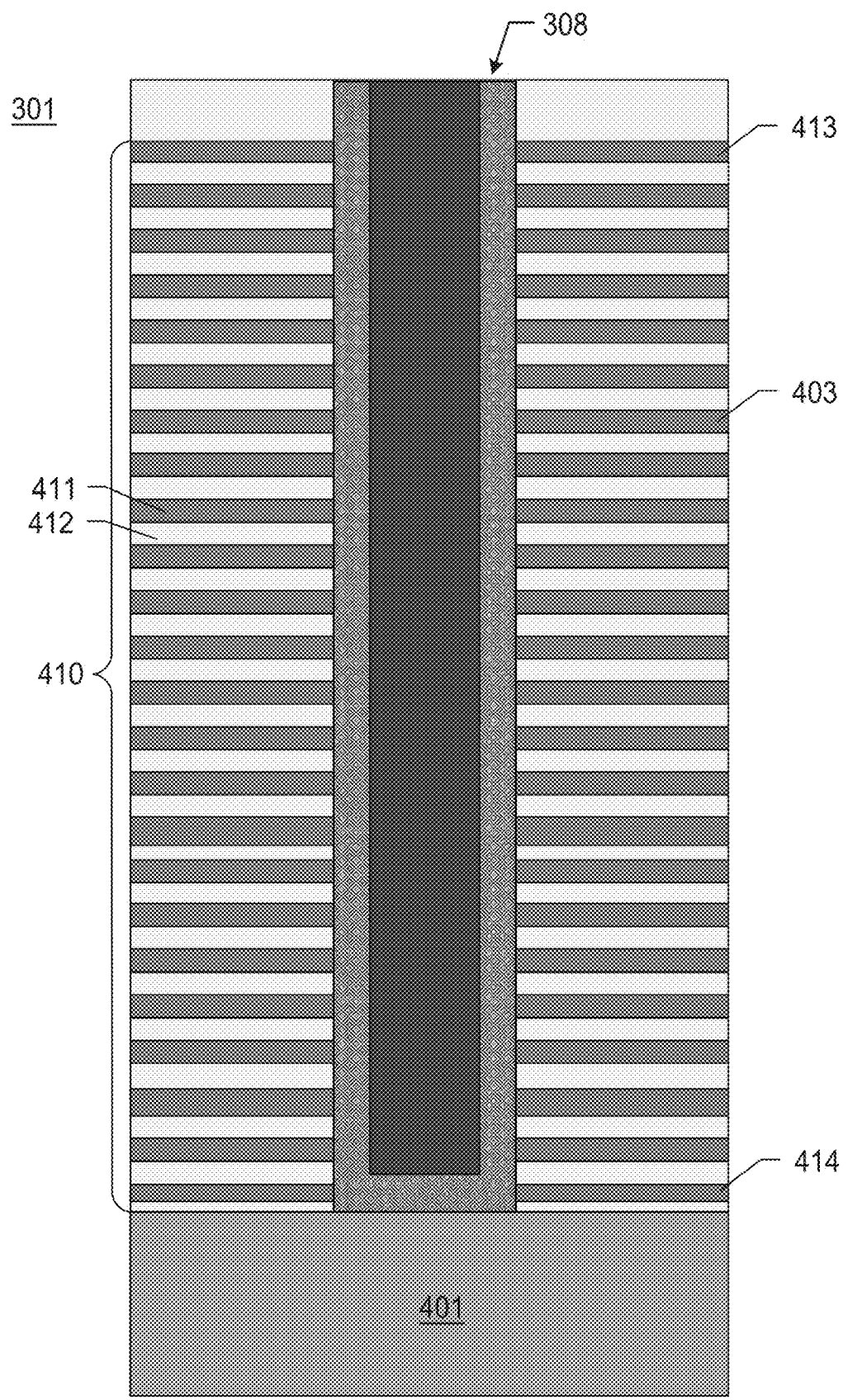
FIG. 13 is a cross-sectional diagram of an example memory cell array illustrated according to an implementation of the present disclosure.

FIG. 13 shows a cross-sectional diagram of an example memory cell array 301 including the NAND memory string 308 in accordance with some aspects of the present disclosure. As shown in FIG. 13, the NAND memory string 308 may include a stack structure 410 including a plurality of gate layers 411 and a plurality of insulating layers 412 stacked alternately, and the memory string 308 penetrating vertically through the gate layers 411 and the insulating layers 412. The gate layers 411 and the insulating layers 412 may be stacked alternately and two adjacent gate layers 411 are isolated by one insulating layer 412. The number of memory cells included in the memory cell array 301 may be determined by the number of pairs of the gate layers 411 and the insulating layers 412 in the stack structure 410.

The material of the gate layers 411 may include a conductive material. The conductive material includes, but not limited to, tungsten (W), cobalt (Co), copper (Cu), aluminum (Al), polysilicon, doped silicon, silicide or any combination thereof. In some implementations, each gate layer 411 includes a metal layer, for example, a tungsten layer. In some implementations, each gate layer 411 includes a doped polysilicon layer. Each gate layer 411 may include a control gate surrounding a memory cell. The gate layer 411 on the top of the stack structure 410 may extend laterally as an upper select gate line, and the gate layer 411 at the bottom of the stack structure 410 may extend laterally as a lower select gate line. The gate layers 411 that extend laterally between the upper select gate line and the lower select gate line may be used as word line layers.

In some implementations, the stack structure 410 may be disposed on a substrate 401. The substrate 401 may include silicon (e.g., single crystal silicon), silicon germanium (SiGe), gallium arsenide (GaAs), germanium (Ge), silicon on insulator (SOI), germanium on insulator (GOI) or any other suitable material.

In some implementations, each NAND memory string 308 includes a channel structure extending through the stack structure 410 vertically. In some implementations, the channel structure includes a channel hole filled with one or more semiconductor materials (e.g., as a semiconductor channel) and one or more dielectric materials (e.g., as a memory film). In some implementations, the semiconductor channel includes silicon, for example, polysilicon. In some implementations, the memory film is a composite dielectric layer including a tunneling layer, a storage layer (also referred to as a "charge trapping/storage layer") and a blocking layer. The channel structure may have a cylindrical shape (e.g., a pillar shape). In accordance with some implementations, the semiconductor channel, the tunneling layer, the storage layer and the blocking layer are arranged radially from the center to the outer surface of the pillar in this order. The tunneling layer may include silicon oxide, silicon oxynitride or any combination thereof. The storage layer may include silicon nitride, silicon oxynitride or any combination thereof. The blocking layer may include silicon oxide, silicon oxynitride, a high dielectric constant (high-k) dielectric or any combination thereof. In one example, the memory film may include a composite layer of silicon oxide/silicon oxynitride/silicon oxide (ONO).

Figure 14:
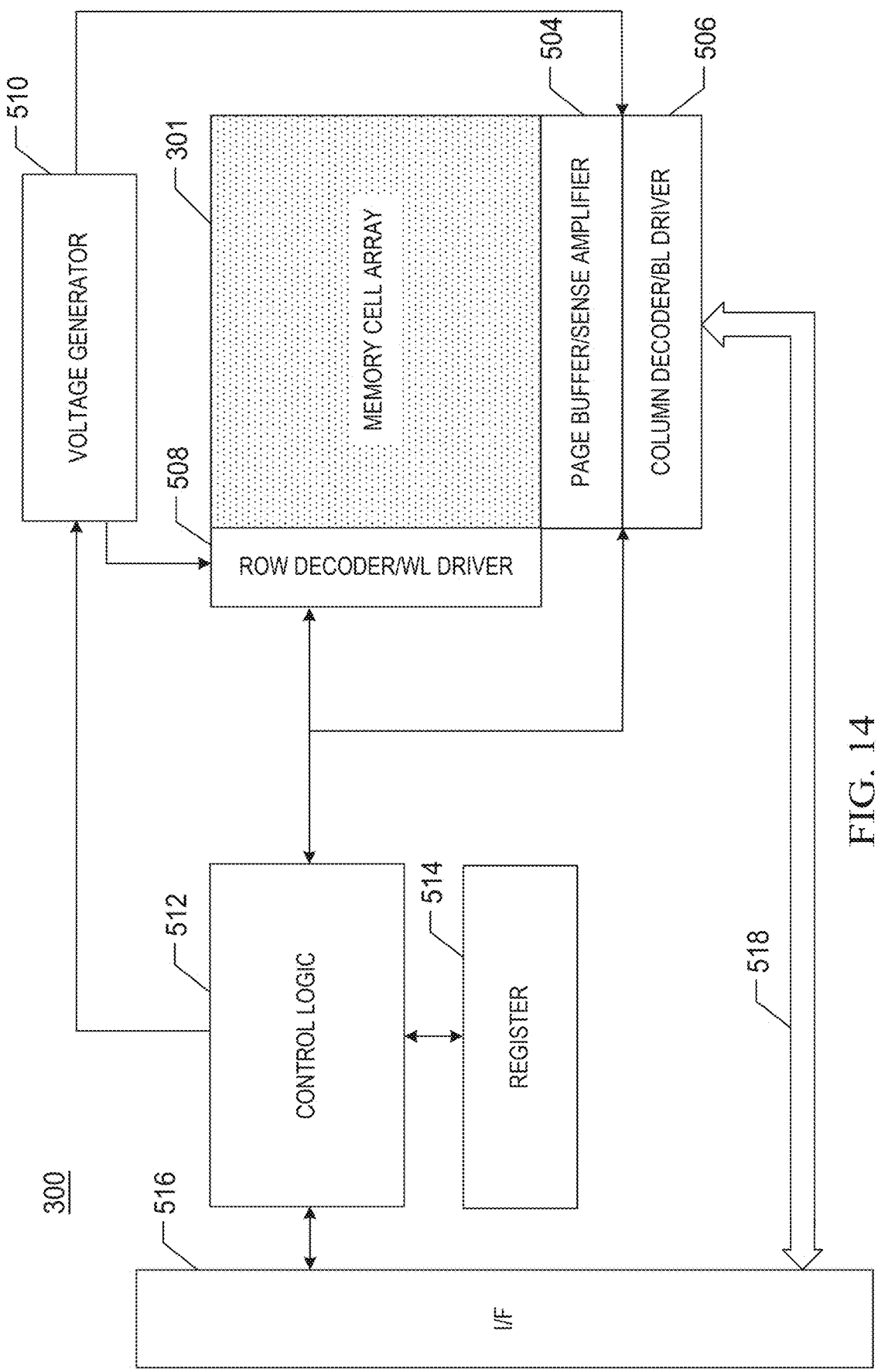
FIG. 14 is a schematic diagram of another example memory device illustrated according to an implementation of the present disclosure.

With reference to FIG. 12 again, the peripheral circuit 302 may be coupled to the memory cell array 301 through the bit line 316, the world line 318, the source line 314, the BSG line 315 and the TSG line 313. The peripheral circuit 302 may include any suitable analog, digital, and mixed-signal circuits and thus facilitating operations of the memory cell array 301 by applying at least one of the voltage signal or current signal to and sensing at least one of the voltage signal or current signal from each target memory cell 306 through the bit line 316, the word line 318, the source line 314, the BSG line 315 and the TSG line 313. The peripheral circuits 302 may include various types of peripheral circuits formed using the metal-oxide-semiconductor (MOS) technology. For example, FIG. 14 illustrates some example peripheral circuits, and the peripheral circuits 302 include a page buffer/sense amplifier 504, a column decoder/bit line driver 506, a row decoder/word line driver 508, a voltage generator 510, a control logic 512, a register 514, an interface 516, and a data bus 518. It should be understood that, in some examples, additional peripheral circuits not shown in FIG. 14 may be further included. The voltage VCCQ provided by the power supply circuit in the implementations of the present disclosure may supply power to devices in the memory device 300 such as the control logic 512 and the voltage generator 510 and also to the interface 516.

The page buffer/sense amplifier 504 may be configured to read and programing (writing) data from/to the memory cell array 301 according to a control signal from the control logic 512. In one example, the page buffer/sense amplifier 504 may store programming data (writing data) to be programmed into the memory cell array 301. In another example, the page buffer/sense amplifier 504 may perform verify operations for programming to ensure that the data have been properly programmed into the memory cell 306 coupled to the selected word line 318. In still another example, the page buffer/sense amplifier 504 may also sense a low power signal from the bit line 316 that represent data bits stored in the memory cells 306 and amplify the small voltage swings to a recognizable logic level in a read operation. The column decoder/bit line driver 506 can be configured to be controlled by the control logic 512 and select one or more NAND memory strings 308 by applying bit line voltage generated from the voltage generator 510.

The row decoder/word line driver 508 can be configured to be controlled by the control logic 512 and select/deselect the memory block 304 of the memory cell array 301 and select/deselect the word line 318 of the memory block 304. The row decoder/word line driver 508 can be further configured to drive the word line 318 using the word line voltage generated from the voltage generator 510. In some implementations, the row decoder/word line driver 508 can also select/deselect and drive the BSG lines 315 and the TSG lines 313. As described below in detail, the row decoder/word line driver 508 is configured to perform the programing operation on the memory cells 306 coupled to one or more selected word lines 318. The voltage generator 510 can be configured to be controlled by the control logic 512 and generate the word line voltage (e.g., a read voltage, a program voltage, a pass voltage, a local boost voltage, a verification voltage, etc.), the bit line voltage, and the source line voltage to be supplied to memory cell array 301.

In some implementations of the present disclosure, the programming operation may include a plurality of stages, and illustratively may include stages of channel pre-charging, channel boosting, programming pulsing and restoring. At the stage of channel pre-charging, the voltage generator may generate the voltage needed by the next stage such as voltage to be applied on the gates and channel boosting voltage; at the stage of channel boosting, channel boosting voltage may be applied on the selected word line; at the stage of programming pulsing, the target voltage for each time of programming may be applied on the selected word line. At the stage of restoring, the voltages on the unselected word lines and the selected word lines may all be depressed to the lower corresponding voltages such as Vcc and Vdd. At the stage of restoring, the purpose of depressurization to the corresponding voltages may be achieved by one or more steps of voltage decreasing. For example, depressurization to intermediate voltages may be performed at first, and the intermediate voltages may be retained for a period of time and then be depressed to the corresponding voltages.

The control logic 512 may be coupled to each peripheral circuit described above and configured to control operations of each peripheral circuit. The register 514 may be coupled to the control logic 512 and include a status register, a command register and an address register for storing status information, command operation codes (OP codes) and command addresses for controlling operations of each peripheral circuit. The interface 516 may be coupled to the control logic 512 and serve as a control buffer to buffer the control command received from the host (not shown) and relay it to the control logic 512, and buffer status information received from the control logic 512 and relay it to the host. The interface 516 may be further coupled to the column decoder/bit line driver 506 through the data bus 518 and serve as a data I/O interface and a data buffer to buffer data and relay it to the memory cell array 301 or relay or buffer data from the memory cell array 301.

What have been described above are only implementations of the present disclosure. However, the scope of the present disclosure is not limited thereto, and variations or substitutions that easily occur to those skilled in the art in light of the technical contents disclosed by the present disclosure will fall within the protection scope of the present disclosure.

What is claimed is:

1. An electronic device, comprising:
  a power supply structure comprising: a node through which a voltage is supplied; and a first circuit having one end coupled to the node via a first resistor and another end grounded; and
  a package structure comprising a second circuit and a die circuit that are connected in parallel between the node and a grounding node,
  wherein the second circuit, the first circuit, and the first resistor are equivalent to a parallel resistor-inductor-capacitor circuit.

2. The electronic device of claim 1, wherein the first circuit comprises a first capacitor and a first inductor connected in series.

3. The electronic device of claim 1, further comprising a plurality of first circuits connected in parallel, wherein the first resistor is connected in series with one of the plurality of first circuits nearest to the second circuit.

4. The electronic device of claim 1, wherein the second circuit comprises
a second resistor, a second inductor and a second capacitor connected in series, and wherein one end of the second circuit is coupled to the node and the other end of the second circuit is grounded.

5. The electronic device of claim 1, wherein the power supply structure further comprises
a third circuit, wherein one end of the third circuit is coupled to the node and another end of the third circuit is grounded, and wherein the third circuit is connected with the first circuit in parallel and comprises a third resistor, a third inductor, and a third capacitor connected in series.

6. The electronic device of claim 5, wherein the power supply structure further comprises a voltage generating circuit having its output terminal coupled to the node.

7. The electronic device of claim 1, further comprising a fourth inductor through which one end of the second circuit is coupled to the node.

8. The electronic device of claim 1, wherein the package structure further comprises a fifth inductor through which the die circuit is coupled to the node.

9. The electrical device of claim 1, wherein the first resistor has a resistance value in a range of 0.5 Ohm to 5 Ohm and an operating frequency of the die circuit is in a range of 0 to 300 MHz.

10. The electronic device of claim 1, further comprising
a first substrate on which the power supply structure is located,
wherein the package structure further comprises a second substrate, wherein the second circuit is located on and/or in the second substrate, wherein the die circuit is located on the second substrate, and
wherein a surface of the first substrate on a side having the first circuit disposed thereon is fixed to a surface of the second substrate on a side away from the die circuit.

11. The electronic device of claim 10, wherein the package structure comprises
a semiconductor device comprising the die circuit,
wherein the semiconductor device is located on the second substrate.

12. An electronic system, comprising
an electronic device that comprises:
a power supply structure comprising a node through which a voltage is supplied; a first circuit having one end coupled to the node via a first resistor and another end grounded; and
a package structure comprising a second circuit and a die circuit that are connected in parallel between the node and a grounding node,
wherein the second circuit, the first circuit and the first resistor are equivalent to a parallel resistor-inductor-capacitor circuit, and
wherein the package structure comprises at least one of a memory device or a memory controller that is coupled to the memory device and is configured to control the memory device.

13. A power supply circuit, comprising:
a node through which a package structure is supplied with power; and
a first circuit having one end coupled to the node via a first resistor and another end grounded,
wherein the package structure comprises a second circuit and a die circuit that are connected in parallel between the node and a grounding node, and wherein the second circuit, the first circuit, and the first resistor are equivalent to a parallel resistor-inductor-capacitor circuit.

14. The power supply circuit of claim 13, wherein the first circuit comprises a first capacitor and a first inductor connected in series.

15. The power supply circuit of claim 13, further comprising
a plurality of first circuits connected in parallel, wherein the first resistor is connected in series with one of the plurality of first circuits nearest to the second circuit.

16. The power supply circuit of claim 13, wherein the second circuit comprises
a second resistor, a second inductor, and a second capacitor connected in series, and wherein one end of the second circuit is coupled to the node and the other end of the second circuit is grounded.

17. The power supply circuit of claim 13, further comprising
a third circuit, wherein one end of the third circuit is coupled to the node and another end of the third circuit is grounded, and wherein the third circuit is connected with the first circuit in parallel and comprises a third resistor, a third inductor, and a third capacitor connected in series.

18. The power supply circuit of claim 17, further comprising a voltage generating circuit having its output terminal coupled to the node.

19. The power supply circuit of claim 13, further comprising a fourth inductor through which one end of the second circuit is coupled to the node.

20. The power supply circuit of claim 13, wherein the package structure further comprises a fifth inductor through which the die circuit is coupled to the node.

* * * * *